(12) United States Patent
Tokuda et al.

(10) Patent No.: US 8,474,130 B2
(45) Date of Patent: Jul. 2, 2013

(54) TRIPOD CONSTANT VELOCITY JOINT, AND METHOD AND DEVICE FOR ASSEMBLING SAME

(75) Inventors: Yoshihiro Tokuda, Mooka (JP);
Masafumi Yamamoto, Mooka (JP);
Masanori Takahashi, Utsunomiya (JP);
Hideki Kobayashi, Utsunomiya (JP);
Kaoru Tanaka, Utsunomiya (JP); Yuki Funaki, Utsunomiya (JP); Tomohiko Yamamoto, Mooka (JP); Tetsuya Watanabe, Mooka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/263,991

(22) PCT Filed: Feb. 22, 2010

(86) PCT No.: PCT/JP2010/052624
§ 371 (c)(1),
(2), (4) Date: Dec. 2, 2011

(87) PCT Pub. No.: WO2010/009723
PCT Pub. Date: Oct. 21, 2010

(65) Prior Publication Data
US 2012/0071249 A1   Mar. 22, 2012

(30) Foreign Application Priority Data

Apr. 16, 2009  (JP) ................................. 2009-100273
Apr. 16, 2009  (JP) ................................. 2009-100274

(51) Int. Cl.
*B23P 19/00*  (2006.01)
*F16D 3/205*  (2006.01)

(52) U.S. Cl.
USPC ........................................... 29/721; 464/111

(58) Field of Classification Search
USPC ................. 29/721, 897.2; 464/111, 173, 175;
277/634–636; 74/18; 403/50, 51
See application file for complete search history.

(56) References Cited

U.S. PATENT DOCUMENTS

| 5,911,301 A * | 6/1999 | Ozawa et al. ............. 198/345.3 |
| 6,390,925 B1 | 5/2002 | Perrow |

(Continued)

FOREIGN PATENT DOCUMENTS

| JP | 06-312326 | 11/1994 |
| JP | 2692030 | 12/1997 |

(Continued)

OTHER PUBLICATIONS

International Search Report and Written Opinion corresponding to International Application No. PCT/JP2010/052624 dated Apr. 6, 2010.

(Continued)

*Primary Examiner* — John C Hong
(74) *Attorney, Agent, or Firm* — Squire Sanders (US) LLP

(57) ABSTRACT

Provided are a tripod constant velocity joint, and a method and a device for assembling the joint. The opening of a through-hole formed in an inner member of the tripod constant velocity joint has formed therein a tapered, reduced diameter section having a diameter tapered from the opening toward the inside. A first annular groove is formed in the side wall of a driving power transmission shaft, and a clip serving as an engaging member is engaged with the first annular groove. A second annular groove is formed in the inner wall of the through-hole in the inner member. In inserting the driving power transmission shaft through the through-hole in the inner member, the tapered, reduced diameter section guides the shaft in such a manner that the clip is contracted toward the bottom surface of the first annular groove. The clip expands and contracts due to the elasticity thereof when the positions of the first annular groove and the second annular groove coincide with each other.

2 Claims, 26 Drawing Sheets

U.S. PATENT DOCUMENTS

| | | |
|---|---|---|
| 7,065,862 B1 * | 6/2006 | Yamamoto et al. ............ 29/715 |
| 2009/0054165 A1 | 2/2009 | Kobayashi |

FOREIGN PATENT DOCUMENTS

| | | |
|---|---|---|
| JP | 2000-046061 | 2/2000 |
| JP | 2002-370679 A | 12/2002 |
| JP | 2003-194088 A | 7/2003 |
| JP | 3626127 | 3/2005 |
| JP | 2006-207721 A | 8/2006 |
| JP | 2006-242263 A | 9/2006 |
| JP | 2008-256022 | 10/2008 |
| JP | 2009-068508 A | 4/2009 |
| WO | 2007/074630 | 7/2007 |

OTHER PUBLICATIONS

Office Action—Rejection of the Application dated Jan. 22, 2013 corresponding to Japanese Patent Application No. 2009-100273 and English translation thereof.

Office Action—Rejection of the Application dated Jan. 22, 2013 corresponding to Japanese Patent Application No. 2009-100274 and English translation thereof.

* cited by examiner

US 8,474,130 B2

TRIPOD CONSTANT VELOCITY JOINT, AND METHOD AND DEVICE FOR ASSEMBLING SAME

TECHNICAL FIELD

The present invention relates to a tripod constant velocity joint in which roller members mounted on trunnions of an inner member are slidably engaged in track grooves defined in an inner wall of an outer member, as well as to a method of and an apparatus for assembling the same.

BACKGROUND ART

As is well known in the art, tripod constant velocity joints have an outer member including a bottomed tubular cup-shaped portion with a shaft projecting from one end thereof, and an inner member positioned on and fixed to the distal end of a drive power transmitting shaft that is inserted in the outer member. The drive power transmitting shaft has splines (teeth) on a circumferential side wall thereof, and the inner member has a through hole defined therein, which has splines (teeth) on an inner wall thereof. When the distal end of the drive power transmitting shaft is inserted into the through hole, the splines mesh with each other, thereby joining the drive power transmitting shaft and the inner member to each other.

The distal end of the drive power transmitting shaft has an annular groove defined in a side wall thereof. A substantially C-shaped clip engages in the annular groove, which is exposed out of the through hole, thereby preventing the inner member from becoming dislodged from the drive power transmitting shaft (see, for example, Japanese Patent No. 2692030).

Japanese Patent No. 3626127 proposes that in order to prevent the inner member from becoming dislodged from the drive power transmitting shaft, annular grooves are defined both in the inner wall of the inner member and in the side wall of the drive power transmitting shaft. Also, a clip engages in the annular grooves, as is the case with a Birfield constant velocity joint.

The cup-shaped portion of the outer member has a plurality of (generally, three) track grooves defined in an inner wall thereof, and the inner member has trunnions projecting from a side wall of a ring-shaped annular portion.

The trunnions extend toward the track grooves. Roller members are rotatably held in engagement with the respective trunnions by rolling members such as needle bearings or the like, and the roller members are slidably inserted in the track grooves.

The tripod constant velocity joint of the above structure is generally assembled manually by a worker in the following manner. First, the worker brings the splines of the inner member into mesh with the splines on the distal end of the drive power transmitting shaft. Thereafter, the worker places the roller members on the respective trunnions with the rolling members held on the inner walls thereof, and inserts the roller members into the track grooves of the outer member.

It is tedious and time-consuming, and not of good working efficiency, for the worker to assemble the tripod constant velocity joint manually. In view of this drawback, there has been a demand for an assembly apparatus for automatically assembling a tripod constant velocity joint. For example, Japanese Laid-Open Patent Publication No. 06-312326 proposes an assembly apparatus, which is focused on the timing required to fill a cup-shaped portion with grease.

According to the assembly apparatus disclosed in Japanese Laid-Open Patent Publication No. 06-312326, as can be understood from FIGS. 7 and 8 thereof, an inner member including roller members mounted on trunnions and a joint boot are installed on the distal end of a drive power transmitting shaft, and then the roller members are inserted into track grooves provided in a cup-shaped portion, thereby assembling the tripod constant velocity joint. If the inner member including the roller members mounted on the trunnions is inserted beforehand in the cup-shaped portion, and then the drive power transmitting shaft is passed through a through hole of the inner member, then a clip needs to be shrunk and passed through the through hole of the inner member, irrespective of whether the clip engages in the annular groove of the drive power transmitting shaft, which is exposed outside of the through hole of the inner member, as disclosed in Japanese Patent No. 2692030, or whether the clip engages both in the annular groove provided in the inner wall of the through hole of the inner member, and in the annular groove of the drive power transmitting shaft, as disclosed in Japanese Patent No. 3626127. Unless the clip is shrunk, the clip cannot pass through the through hole.

In other words, the assembly apparatus disclosed in Japanese Laid-Open Patent Publication No. 06-312326 is capable only of automating a process of housing the inner member mounted on the drive power transmitting shaft in the cup-shaped portion, but is unable to automate the process of installing the inner member on the drive power transmitting shaft.

In order to shrink the clip, it may be necessary to employ a shrinker, which has been used in the assembly of Birfield constant velocity joints. However, such a shrinker fails to reach into deep areas of the track grooves, because the track grooves tend to be long in a tripod constant velocity joint. Consequently, it is highly difficult to shrink the clip automatically.

SUMMARY OF INVENTION

It is a general object of the present invention to provide a tripod constant velocity joint, which allows an engaging member such as a clip or the like to be shrunk at a time when the drive power transmitting shaft is passed through a through hole of an inner member.

A major object of the present invention is to provide a tripod constant velocity joint, which lends itself to being automatically assembled on a machine.

Another object of the present invention is to provide an assembly method, which is capable of automatically performing a process of installing an inner member on a drive power transmitting shaft.

Still another object of the present invention is to provide an assembly apparatus, which enables such an assembly method to be carried out.

According to an embodiment of the present invention, there is provided a tripod constant velocity joint including an outer member having track grooves defined in an inner wall thereof, and an inner member having a through hole defined therein with teeth disposed on an inner wall thereof, which are held in mesh with teeth on a drive power transmitting shaft, and trunnions projecting from a side wall thereof and extending toward the track grooves, wherein:

the through hole of the inner member has a tapered progressively-smaller-diameter portion, which is progressively smaller in diameter in a tapered fashion inwardly from an opening of the through hole;

the drive power transmitting shaft has a first annular groove defined therein across the teeth, and the through hole has a second annular groove defined in the inner wall thereof;

the inner member is prevented from becoming dislodged from the drive power transmitting shaft by a single engaging member that engages both in the first annular groove and in the second annular groove; and the tapered progressively-smaller-diameter portion of the through hole guides the engaging member, which engages with the first annular groove of the drive power transmitting shaft, so as to shrink the engaging member toward a bottom of the first annular groove when the drive power transmitting shaft is inserted into the through hole.

With the above arrangement, the tapered progressively-smaller-diameter portion automatically shrinks the engaging member, and then the engaging member and the drive power transmitting shaft are inserted into the through hole of the inner member. The above arrangement thus makes it possible to shrink the engaging member easily.

According to the present invention, therefore, the drive power transmitting shaft can be coupled mechanically to the inner member, which has been housed in advance in the outer member, using an assembly apparatus or the like. Therefore, the number of tedious and time-consuming manual steps is reduced, and the tripod constant velocity joint can be assembled efficiently.

As described above, the tapered progressively-smaller-diameter portion, which is provided in the opening of the through hole of the inner member, automatically shrinks the engaging member, which engages in the first annular groove of the drive power transmitting shaft, thereby making it possible to insert the drive power transmitting shaft together with the engaging member easily into the through hole. Consequently, the tripod constant velocity joint can easily be mechanically assembled automatically using an assembly apparatus or the like.

A preferred example of the engaging member may be a C-shaped elastic clip. When the first annular groove and the second annular groove are positionally aligned with each other, at a time when the drive power transmitting shaft is inserted into the through hole of the inner member, the clip tends to be restored to its original shape, i.e., to expand, under its own elasticity. When expanded in this manner, the clip engages easily both in the first annular groove and in the second annular groove.

According to an embodiment of the present invention, there also is provided a method of assembling a tripod constant velocity joint by fitting a drive power transmitting shaft, having an engaging member engaging in a first annular groove defined therein, into a through hole defined in an inner member, the inner member being housed in an outer member having track grooves defined in an inner wall thereof, and having on a side wall thereof trunnions with roller members mounted thereon, which are slidably inserted in the track grooves, the method comprising the steps of:

holding an end of the drive power transmitting shaft;

aligning an axis of the drive power transmitting shaft and a center of the through hole with each other;

bringing the axis of the drive power transmitting shaft and the center of the through hole into phase with each other; and displacing the outer member, which houses therein the inner member with the roller members mounted on the trunnions and being slidably inserted in the track grooves, relatively with respect to the drive power transmitting shaft, thereby fitting the drive power transmitting shaft into the through hole of the inner member, wherein the engaging member is reduced in diameter and inserted into the through hole while being guided by a tapered progressively-smaller-diameter portion defined in an opening of the through hole of the inner member, and the engaging member engages in a second annular groove defined in an inner wall of the through hole.

According to the present invention, the engaging member is automatically shrunk by the tapered progressively-smaller-diameter portion of the inner member of the tripod constant velocity joint, and the drive power transmitting shaft together with the engaging member is inserted into the through hole of the inner member. Therefore, it is possible to shrink the engaging member easily, and to cause the engaging member to engage both in the annular groove of the inner member and in the annular groove of the drive power transmitting shaft.

According to the present invention, therefore, the drive power transmitting shaft and the inner member can be coupled to each other simply by pressing the drive power transmitting shaft into the through hole of the inner member, which has been housed in advance in the outer member. When the drive power transmitting shaft is pressed automatically by an apparatus, the number of tedious and time-consuming manual steps is reduced, and the tripod constant velocity joint can be assembled efficiently.

In summary, according to the present invention, the tapered progressively-smaller-diameter portion is provided in the opening of the through hole of the inner member of the tripod constant velocity joint, so that when the drive power transmitting shaft is pressed into the through hole of the inner member, which has been housed in advance in the outer member, the tapered progressively-smaller-diameter portion automatically shrinks the engaging member, which engages in the first annular groove of the drive power transmitting shaft. Therefore, when the drive power transmitting shaft together with the engaging member is inserted into the through hole, the drive power transmitting shaft and the inner member are coupled to each other. Therefore, it is possible to automatically assemble the tripod constant velocity joint.

In the above process, a joint boot may be mounted on the outer member when the drive power transmitting shaft is fitted in the through hole of the inner member. In this case, it is preferable to release the joint boot temporarily from the outer member, and thereafter to mount the joint boot again on the outer member. In this manner, air can be removed from the joint boot.

According to another embodiment of the present invention, there is provided a constant velocity joint assembly apparatus for assembling a tripod constant velocity joint by fitting a drive power transmitting shaft with an engaging member engaging in an annular groove defined therein into a through hole defined in an inner member, the inner member being housed in an outer member having track grooves defined in an inner wall thereof, and having on a side wall thereof trunnions with roller members mounted thereon, which are slidably inserted in the track grooves, the constant velocity joint assembly apparatus comprising:

a shaft holding mechanism for holding an end of the drive power transmitting shaft;

a centering mechanism for aligning an axis of the drive power transmitting shaft and a center of the through hole with each other;

a turning mechanism for bringing the drive power transmitting shaft and the through hole of the inner member into phase with each other; and an outer member displacing mechanism for displacing the outer member, which houses the inner member therein, with respect to the drive power transmitting shaft.

With the above arrangement, the drive power transmitting shaft and the inner member can be coupled to each other simply by pressing the drive power transmitting shaft into the through hole of the inner member, which has been housed in advance in the outer member. This is because, as the drive power transmitting shaft is pressed progressively into the through hole, a tapered progressively-smaller-diameter portion of the inner member of the tripod constant velocity joint automatically shrinks the engaging member, until finally the engaging member engages both in the annular groove defined in the inner member and in the annular groove defined in the drive power transmitting shaft.

According to the present invention, the tripod constant velocity joint can be assembled and installed simultaneously on the drive power transmitting shaft automatically. Therefore, the number of tedious and time-consuming manual steps is reduced, and the tripod constant velocity joint can be assembled efficiently.

The constant velocity joint assembly apparatus should preferably further include a boot gripping mechanism for gripping a joint boot, which has been mounted in advance on the drive power transmitting shaft. The boot gripping mechanism temporarily releases the joint boot from the outer member when the drive power transmitting shaft is fitted in the through hole of the inner member, and thereafter mounts the joint boot again on the outer member. In this manner, air can easily be removed from the joint boot.

The constant velocity joint assembly apparatus should preferably further include an engaging member pressing mechanism for pressing the engaging member. The engaging member pressing mechanism causes the engaging member to engage with the annular groove of the drive power transmitting shaft reliably.

DESCRIPTION OF EMBODIMENTS

A tripod constant velocity joint according to a preferred embodiment of the present invention, in relation to an assembly method for assembling the tripod constant velocity joint and an assembly apparatus for carrying out the assembly method, will be described in detail below with reference to the accompanying drawings.

Figure 1:
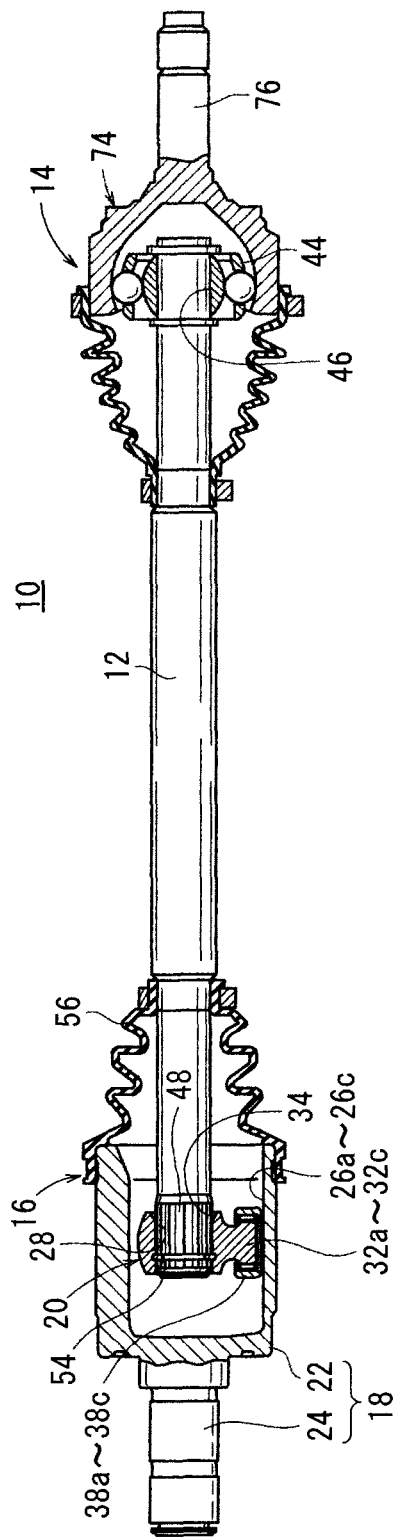
FIG. 1 is a schematic cross-sectional view, shown partially in side elevation, of an overall structure of a drive power transmitting mechanism incorporating a tripod constant velocity joint according to an embodiment of the present invention.

First, a drive power transmitting mechanism as a completed product will be described below with reference to FIGS. 1 through 3. The drive power transmitting mechanism 10 includes a drive power transmitting shaft 12 with a Birfield constant velocity joint 14 mounted on one end thereof, and a tripod constant velocity joint 16 according to the present embodiment mounted on the remaining other end thereof.

The Birfield constant velocity joint 14 may be of the type disclosed in Japanese Laid-Open Patent Publication No. 2000-046061, for example, or of any other known design. Therefore, details of the Birfield constant velocity joint 14 will not be described below.

Figure 2:
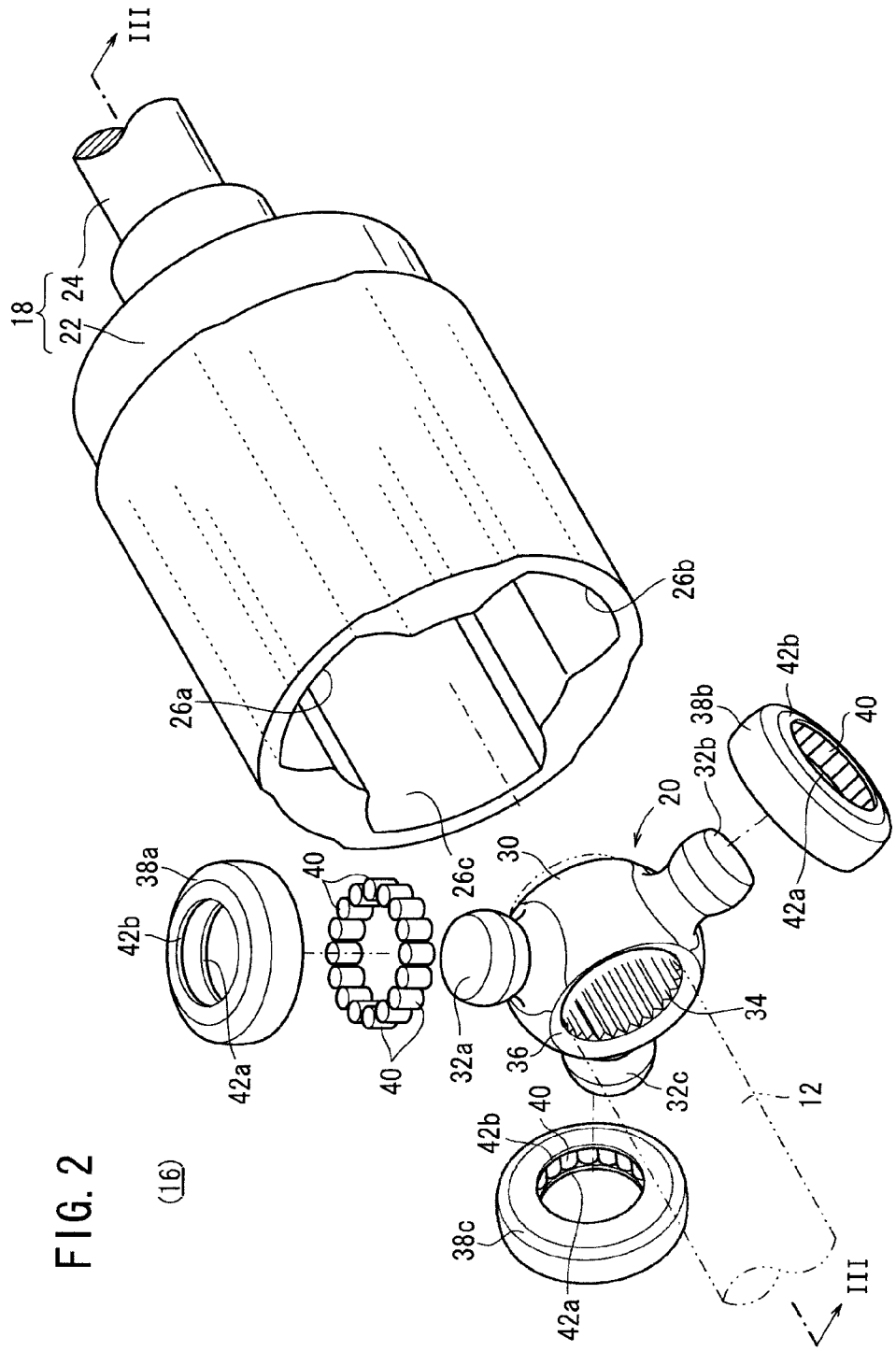
FIG. 2 is an exploded fragmentary perspective view of the tripod constant velocity joint incorporated in the drive power transmitting mechanism shown in FIG. 1.
Figure 3:
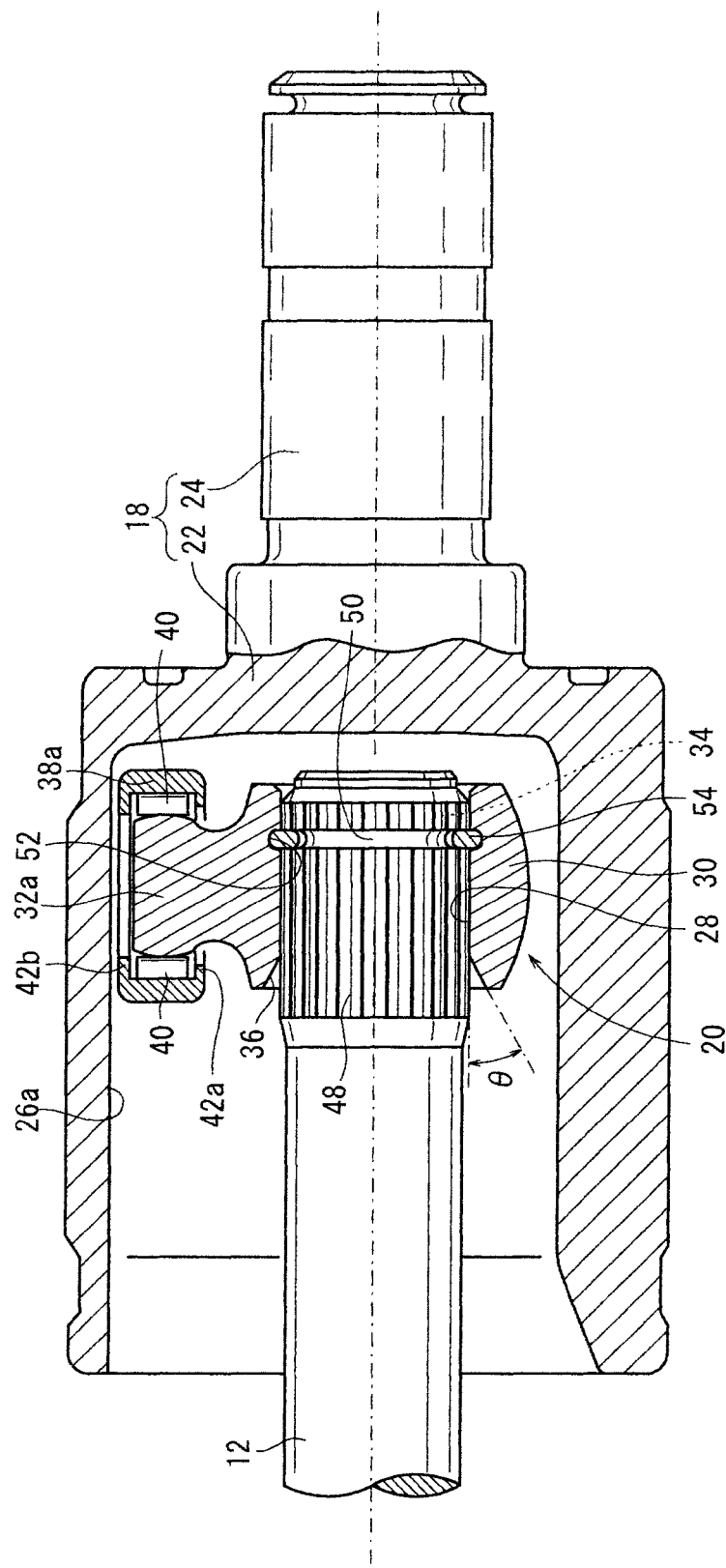
FIG. 3 is a cross-sectional view taken along line III-III of FIG. 2.

The tripod constant velocity joint 16 includes an outer member 18 and an inner member 20 fitted over a portion of the drive power transmitting shaft 12 in the vicinity of an end thereof, as shown in FIG. 2, which is an exploded fragmentary perspective view of the tripod constant velocity joint 16, and FIG. 3, which is a cross-sectional view (sectional side elevational view) taken along line III-III of FIG. 2. In FIG. 3, the drive power transmitting shaft 12 and the inner member 20 are shown as being coupled to each other outside of the outer member 18. Actually, however, the drive power transmitting shaft 12 is coupled to the inner member 20 within a cup-shaped portion 22 of the outer member 18 (to be described later).

The outer member 18 includes the cup-shaped portion 22, which is of a bottomed tubular shape, and a shank 24 that projects from one end of the cup-shaped portion 22. The shank 24, which is coupled to the rotational shaft of a transmission (not shown), for example, transmits rotational drive power of the transmission to the drive power transmitting shaft 12 through the cup-shaped portion 22 and the inner member 20.

The cup-shaped portion 22 has three track grooves 26a through 26c defined on an inner wall thereof, which are angularly spaced at intervals of 120°. As shown in FIG. 3, the track grooves 26a through 26c extend to the bottom of the inner wall of the cup-shaped portion 22.

As shown in FIG. 3, the inner member 20 includes a ring-shaped annular portion 30 serving as a disk-shaped member, with a through hole 28 defined therein, and three trunnions 32a through 32c (see FIG. 2) projecting from a side wall of the annular portion 30. The through hole 28 extends along a direction in which the cup-shaped portion 22 and the drive power transmitting shaft 12 extend. The through hole 28 has an inner wall including splines 34 (teeth), which extend along the axis of the through hole 28.

The through hole 28 includes a tapered progressively-smaller-diameter portion 36, which is progressively smaller in diameter in a tapered fashion inwardly from the opening thereof (the end face of the annular portion 30). The tapered progressively-smaller-diameter portion 36 serves as a shrinker, as described later. In the present embodiment, the tapered progressively-smaller-diameter portion 36 has a bevel angle θ (see FIG. 3) of about 30°.

Each of the trunnions 32a through 32c is in the form of a cylinder, which bulges slightly at a middle portion thereof in the heightwise direction. Adjacent ones of the trunnions 32a through 32c are angularly spaced from each other at equal intervals of 120°. Therefore, the trunnions 32a through 32c are kept in phase with the respective track grooves 26a through 26c. The trunnions 32a through 32c extend toward the respective track grooves 26a through 26c.

Roller members 38a through 38c are mounted respectively on the trunnions 32a through 32c, with a plurality of rolling members, such as needle bearings 40 or the like, being interposed between the roller members 38a through 38c and the trunnions 32a through 32c. Therefore, the roller members 38a through 38c are rotatable about the trunnions 32a through 32c, respectively.

Each of the roller members 38a through 38c has a set of flanges 42a, 42b that project radially inward. All of the needle bearings 40 are held on the roller members 38a through 38c as a result of being sandwiched by the flanges 42a, 42b.

The drive power transmitting shaft 12 serves as a relay shaft for transmitting rotational drive power of the transmission, which is transmitted through the outer member 18, to a hub (not shown) via the Birfield constant velocity joint 14. As shown in FIG. 3, one end of the drive power transmitting shaft 12 is inserted into the cup-shaped portion 22 and extends through the through hole 28 of the inner member 20, while the other end of the drive power transmitting shaft 12 extends through a through hole 46 defined in an inner member 44 of the Birfield constant velocity joint 14 (see FIG. 1).

As shown in FIG. 3, one end of the drive power transmitting shaft 12 has splines 48 (teeth) thereon. The splines 48 mesh with the splines 34 on the inner wall of the through hole 28, when the one end of the drive power transmitting shaft 12 extends through the through hole 28 of the inner member 20.

Figure 4:
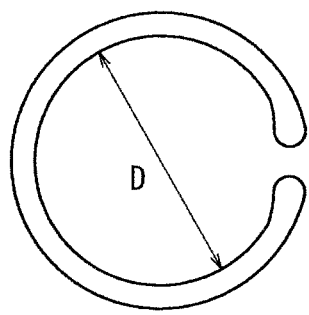
FIG. 4 is a front elevational view showing an overall structure of an engaging member (clip) of the tripod constant velocity joint shown in FIG. 2.

As can be understood from FIG. 3, the one end of the drive power transmitting shaft 12 including the splines 48 has a first annular groove 50 defined therein, which extends across the splines 48. The inner wall of the through hole 28 of the inner member 20 also has a second annular groove 52 defined therein, which extends across the splines 34. A substantially C-shaped clip 54 (engaging member), as shown in FIG. 4, engages both in the first annular groove 50 and in the second annular groove 52, thereby preventing the inner member 20 from becoming dislodged from the drive power transmitting shaft 12.

The joint boot is omitted from illustration in FIGS. 2 and 3. Actually, the joint boot 56 (see FIG. 1) is mounted on the cup-shaped portion 22 of the outer member 18 and the drive power transmitting shaft 12, so as to extend from the cup-shaped portion 22 to the drive power transmitting shaft 12. A lubricant (not shown) such as grease or the like, for example, is filled in the cup-shaped portion 22.

A constant velocity joint assembly apparatus (hereinafter referred to simply as an "assembly apparatus") according to the present embodiment will be described below. In the drawings referred to below, certain members may be shown as cut away, or certain members and mechanisms may be omitted from illustration, in order to clarify the structure of the constant velocity joint assembly apparatus.

Figure 5:
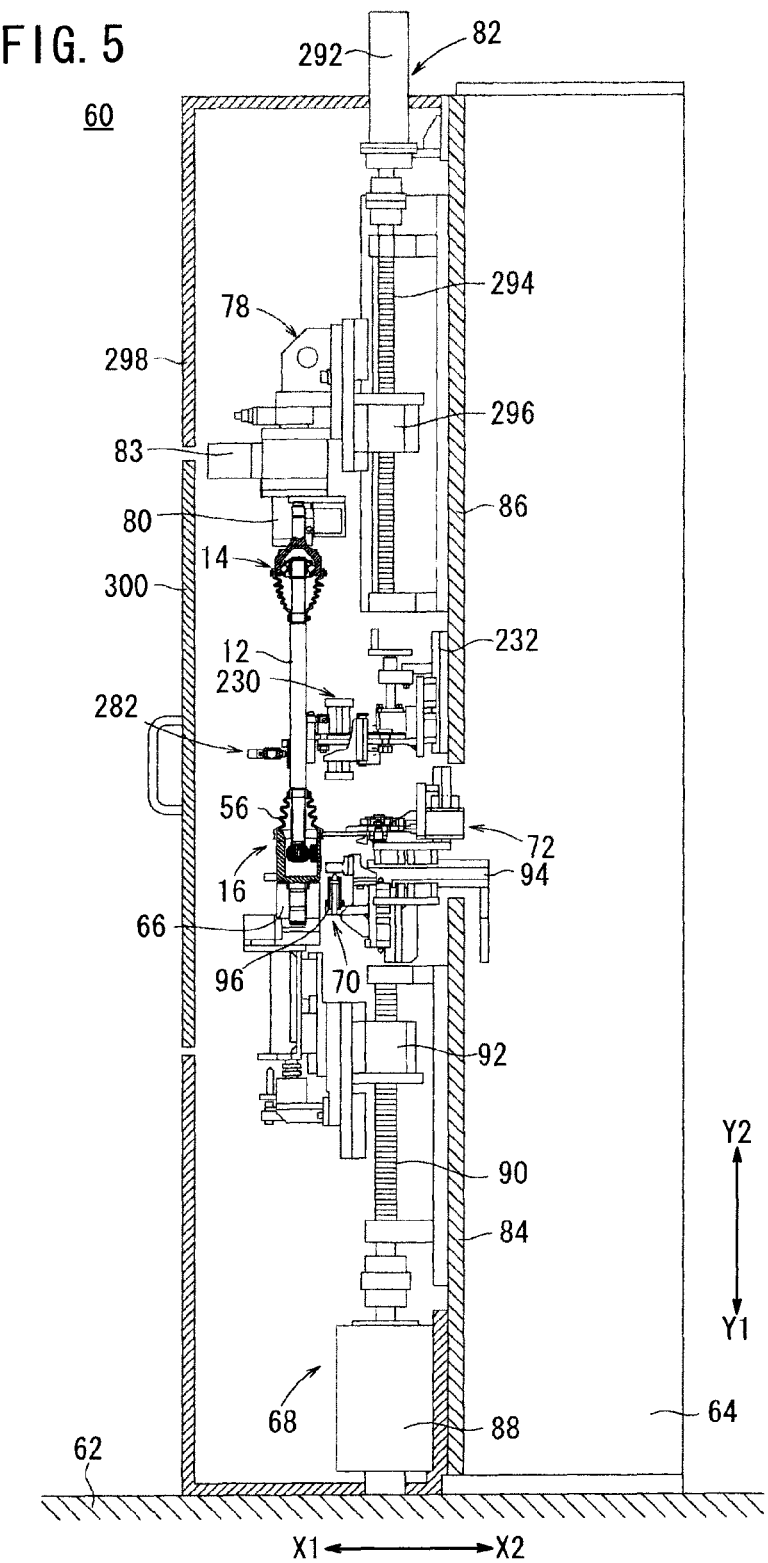
FIG. 5 is a schematic side elevational view, partially in vertical cross section, of a constant velocity joint assembly apparatus according to the embodiment.

FIG. 5 is a schematic side elevational view, partially in vertical cross section, of an assembly apparatus 60 for assembling the drive power transmitting mechanism 10. The assembly apparatus 60 serves to produce the drive power transmitting mechanism 10 referred to above, by mounting the tripod constant velocity joint 16 on the remaining other end of the drive power transmitting shaft 12, while the Birfield constant velocity joint 14 is mounted on the one end thereof. The assembly apparatus 60 is supported on a support column 64, which is vertically mounted on a floor 62 of a working station.

As shown in FIG. 5, the assembly apparatus 60 includes a first outer member holder 66 for holding the outer member 18 of the tripod constant velocity joint 16, a first ball screw mechanism 68 serving as an outer member displacing mechanism for displacing the outer member 18 together with the first outer member holder 66, a centering mechanism 70 for aligning the axis of the drive power transmitting shaft 12 with the center of the through hole 28 of the inner member 20, a boot gripping mechanism 72 for gripping the joint boot 56, which is mounted on the outer member 18 of the tripod constant velocity joint 16 and the drive power transmitting shaft 12, and a shaft holding mechanism 78 for holding the drive power transmitting shaft 12 by holding a shank 76 of an outer member 74 of the Birfield constant velocity joint 14. The shaft holding mechanism 78 includes a second outer member holder 80 and a second ball screw mechanism 82, which function as a displacing mechanism for displacing the second outer member holder 80. The shaft holding mechanism 78 also includes a turning mechanism 83 for turning the second outer member holder 80 through a predetermined angle, at a time when the drive power transmitting shaft 12 is brought into phase with the through hole 28 of the inner member 20. The turning mechanism 83 thus functions as a phase aligning mechanism.

A first mount plate 84 and a second mount plate 86 are fixed to the support column 64. The first ball screw mechanism 68 and the second ball screw mechanism are supported respectively on the first mount plate 84 and the second mount plate 86.

The first ball screw mechanism 68 includes a first motor 88, a first ball screw 90 coupled to a rotary shaft of the first motor 88, and a first movable nut 92 threaded over the first ball screw 90. The first outer member holder 66 is coupled to the first movable nut 92. When the first motor 88 is energized, the first ball screw 90 rotates about its axis, thereby guiding the first movable nut 92 to move vertically, which in turn enables the first outer member holder 66 to move vertically.

Figure 6:
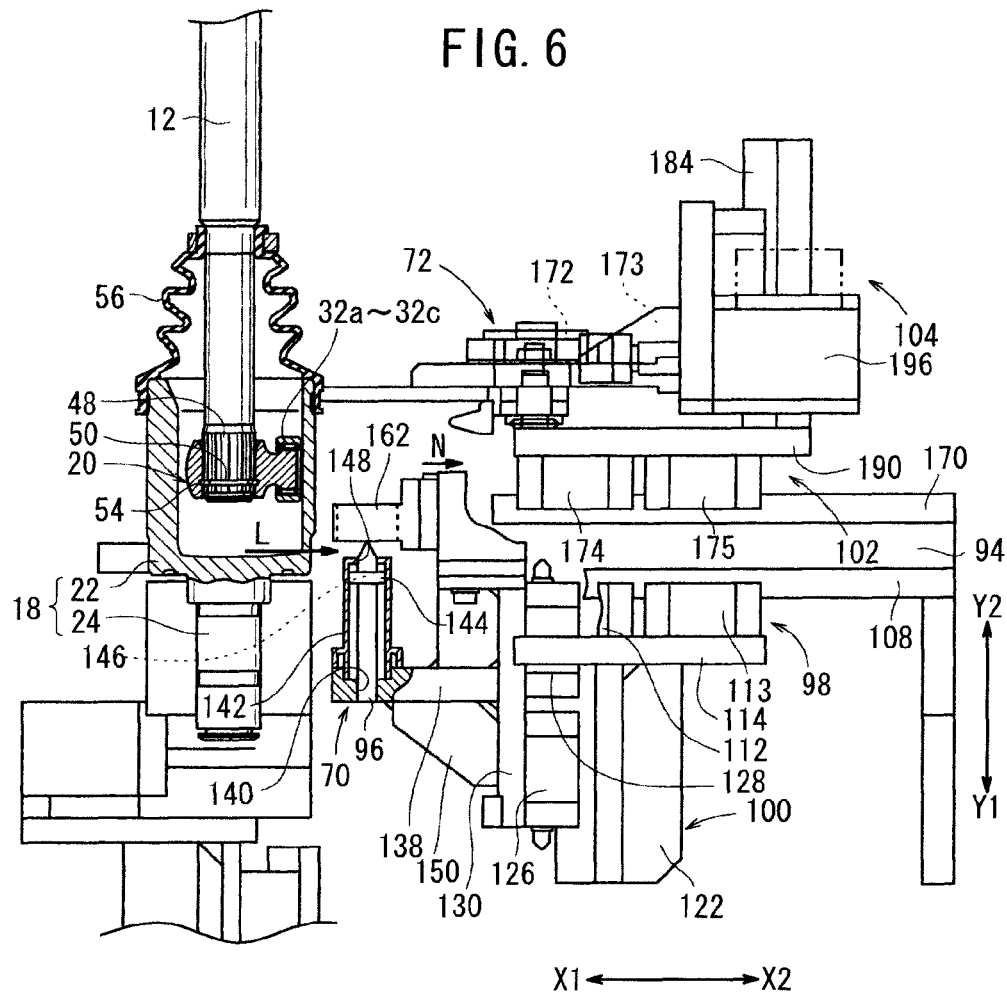
FIG. 6 is an enlarged fragmentary side elevational view of the constant velocity joint assembly apparatus shown in FIG. 5.

As shown in FIGS. 5 and 6, a linear guide support plate 94 substantially in the form of a flat plate is disposed between the first mount plate 84 and the second mount plate 86, and extends in the direction indicated by the arrow X1. On a lower end face of the linear guide support plate 94, as shown in FIG. 6, there are disposed in combination a first linear guide 98 and a second linear guide 100 for displacing a shaft positioning member 96 of the centering mechanism 70 in directions indicated by the arrows X1, X2 as well as in directions indicated by the arrows Y1, Y2. On the upper end face of the linear guide support plate 94, there are disposed in combination a third linear guide 102 and a fourth linear guide 104 for displacing the boot gripping mechanism 72 in directions indicated by the arrows X1, X2 as well as in directions indicated by the arrows Y1, Y2. In other words, as shown in FIG. 6, the centering mechanism 70 is displaceable individually in directions indicated by the arrows X1, X2 and in directions indicated by the arrows Y1, Y2, by the first linear guide 98 and the second linear guide 100. Also, as shown in FIG. 6, the boot gripping mechanism 72 is displaceable individually in directions indicated by the arrows X1, X2 and in directions indicated by the arrows Y1, Y2, by the third linear guide 102 and the fourth linear guide 104.

Figure 7:
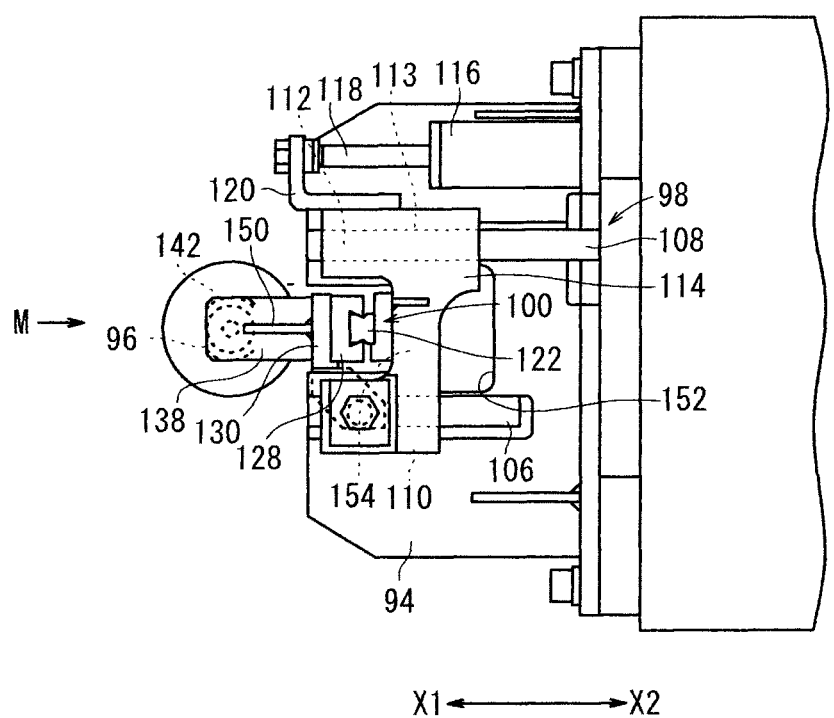
FIG. 7 is a view, partially cut away, taken along the direction indicated by the arrow L in FIG. 6.
Figure 8:
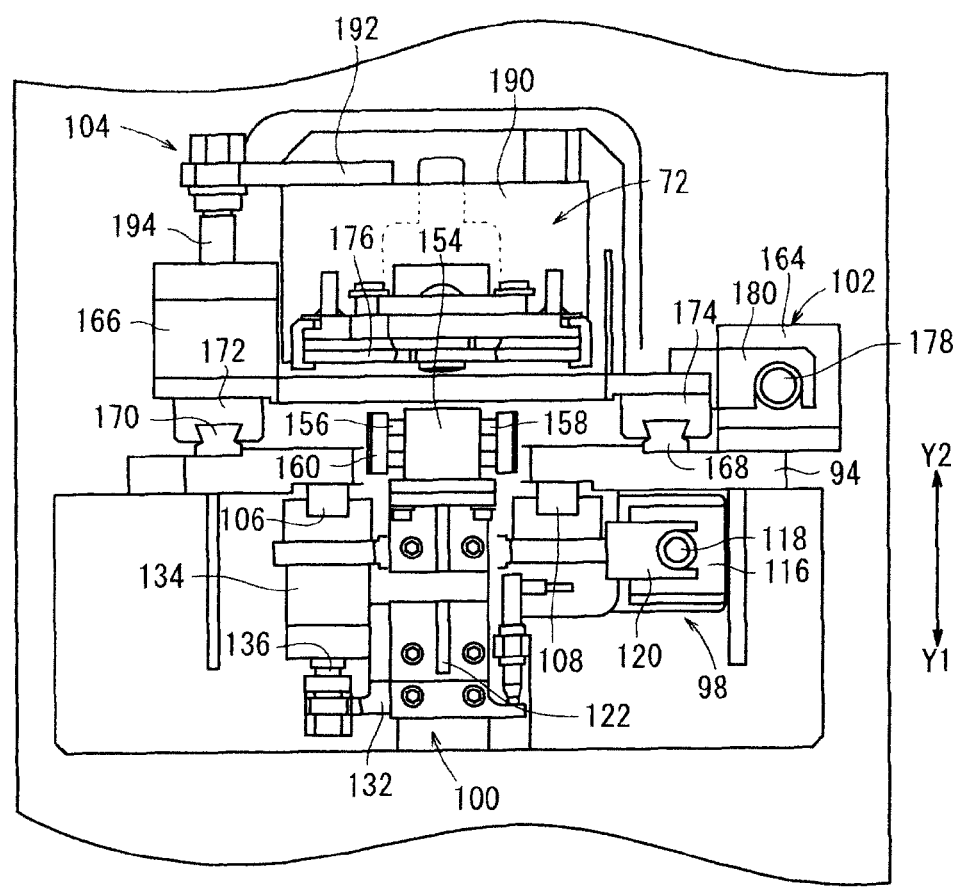
FIG. 8 is a view, partially cut away, taken along the direction indicated by the arrow M in FIG. 6.

As can be understood from FIG. 7, which is a view, partially cut away, taken along the direction indicated by the arrow L in FIG. 6, and from FIG. 8, which is a view, partially cut away, taken along the direction indicated by the arrow M in FIG. 6, the first linear guide 98 has a first guide rail 106 and a second guide rail 108, with a slider 110 that slidably engages with the first guide rail 106, and sliders 112, 113 that slidably engage with the second guide rail 108 (see FIG. 7). A first bridge plate 114 is mounted thereon and extends from the slider 110 to the sliders 112, 113 (see FIG. 7). The first bridge plate 114 is omitted from illustration in FIG. 8.

As shown in FIGS. 7 and 8, a first cylinder 116 is supported on the linear guide support plate 94, although the first cylinder 116 is omitted from illustration in FIGS. 5 and 6. The first cylinder 116 has a first rod 118 coupled to the first bridge plate 114 by a first coupling member 120, which has a bent shape (see FIG. 7). When the first cylinder 116 is actuated to extend and contract the first rod 118, the first bridge plate 114 together with the shaft positioning member 96 on the centering mechanism 70 are displaced in unison with the second linear guide 100 in directions indicated by the arrows X1, X2.

The second linear guide 100 includes a third guide rail 122 which, as shown in FIG. 6, extends in a direction (the direction indicated by the arrow Y1) perpendicular to the first guide rail 106 and the second guide rail 108. As shown in FIGS. 6 and 7, a slider 126 and a slider 128, which are joined mutually to each other, slidably engage with the third guide rail 122. A second bridge plate 130 is mounted on and extends from an end face of the slider 126 to an end face of the slider 128. The second bridge plate 130 is coupled to a second rod 136 of a second cylinder 134 by a second coupling member 132, as shown in FIG. 8. When the second cylinder 134 is actuated, the second bridge plate 130 is displaced along the third guide rail 122 in directions indicated by the arrows Y1, Y2 in FIGS. 6 and 9 (i.e., in directions extending perpendicular to the sheet in FIG. 7).

As shown in FIG. 6, a columnar member 138 that extends parallel to the first guide rail 106 and the second guide rail 108 is mounted on an end face of the second bridge plate 130. The columnar member 138 has a fitting hole 140 defined therein, and the shaft positioning member 96 is firmly fitted in the fitting hole 140 and extends parallel to the third guide rail 122. The shaft positioning member 96 includes a substantially cylindrical body portion and a tapered engaging portion, which becomes progressively smaller in diameter in a tapered fashion toward the tip end thereof. As described later, the tapered engaging portion of the shaft positioning member 96 engages in a bottomed hole (not shown) defined in a distal end face of the drive power transmitting shaft 12.

The body portion of the shaft positioning member 96 extends through a through hole 146 defined in a support member 144 in the form of a flat plate, which is fitted in a guide sleeve 142 vertically mounted on the columnar member 138, and a through hole 148 defined in an end face of the guide sleeve 142. The through holes 146, 148 have diameters corresponding to the diameter of the body portion of the shaft positioning member 96. The shaft positioning member 96 is thus firmly supported and is prevented from swinging.

The columnar member 138 also is firmly supported by a triangular plate 150, which is mounted on the end face of the second bridge plate 130. Therefore, the shaft positioning member 96 also is protected against swinging movements, which would otherwise occur if the columnar member 138 were swingable.

As can be seen from FIG. 7, the linear guide support plate 94 has a substantially U-shaped recess 152 defined therein. As shown in FIG. 8, a pressing tooth cylinder 154, which serves as a clip pressing mechanism for pressing the clip 54 (see FIGS. 3 and 5), is disposed in the recess 152.

The pressing tooth cylinder 154 has a set of pressing tooth rods 156, 158, which are movable in synchronism toward and away from each other. Pressing tooth coupling plates 160 are mounted respectively on distal ends of the pressing tooth rods 156, 158. Pressing teeth 162, shown in FIG. 6, are disposed respectively on the pressing tooth coupling plates 160. When the pressing tooth cylinder 154 is actuated, the pressing tooth rods 156, 158 move toward and away from each other to open and close the pressing teeth 162.

The boot gripping mechanism 72 is displaceable in directions indicated by the arrows X1, X2 (directions perpendicular to the sheet of FIG. 8) when a third cylinder 164, as shown in FIG. 8, is actuated. The boot gripping mechanism 72 also is displaceable in directions indicated by the arrows Y1, Y2 in FIG. 6 when a fourth cylinder 166 is actuated.

Figure 9:
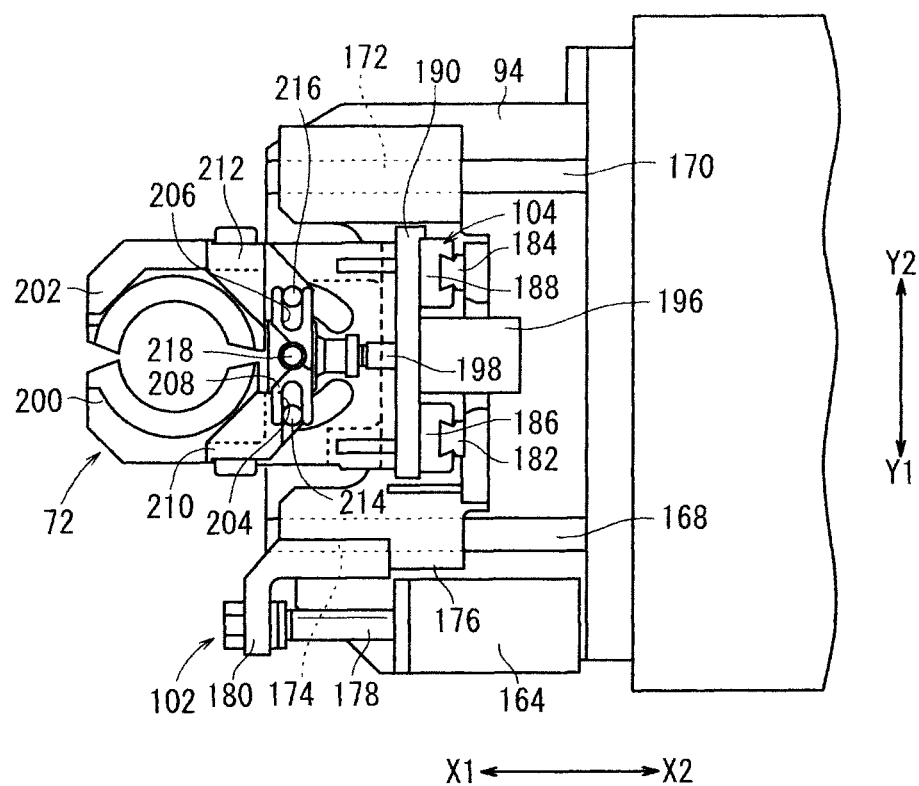
FIG. 9 is a view, partially cut away, taken along the direction indicated by the arrow N in FIG. 6.

More specifically, as shown in FIGS. 6 and 8, sliders 172, 173 and sliders 174, 175 are disposed above a fourth guide rail 168 and a fifth guide rail 170, respectively, of the third linear guide 102, and a third bridge plate 176 is mounted on and extends between end faces of the sliders 172, 173 and the sliders 174, 175. As shown in FIG. 8 and FIG. 9, which is a view, partially cut away, taken along the direction indicated by the arrow N in FIG. 6, a third cylinder 164 is supported on an end face of the linear guide support plate 94, which is remote from the end face that supports the first cylinder 116 thereon. The third cylinder 164 has a third rod 178 coupled to the third bridge plate 176 by a bent third coupling member 180 (see FIG. 9). When the third cylinder 164 is actuated in order to extend and contract the third rod 178, the third bridge plate 176 together with the boot gripping mechanism 72 on the fourth linear guide 104 are displaced in unison with the fourth linear guide 104 in directions indicated by the arrows X1, X2.

The fourth linear guide 104 includes a sixth guide rail 182 and a seventh guide rail 184, which are mounted on the third bridge plate 176 so as to extend in the direction indicated by the arrow Y2 (see FIG. 9). A fourth bridge plate 190 is mounted on and extends from a slider 186 on the sixth guide rail 182 to a slider 188 on the seventh guide rail 184. The fourth bridge plate 190 is coupled to a fourth rod 194 of the fourth cylinder 166 by a fourth coupling member 192, as shown in FIG. 8. When the fourth cylinder 166 is actuated, therefore, the fourth bridge plate 190 is displaced in directions indicated by the arrows Y1, Y2 (i.e., directions perpendicular to the sheet of FIG. 9) along the sixth guide rail 182 and the seventh guide rail 184.

As shown in FIG. 9, the boot gripping mechanism 72 includes a fifth cylinder 196 mounted on the fourth bridge plate 190, and a first finger 200 and a second finger 202, which can be opened and closed in response to movement of a fifth rod 198 of the fifth cylinder 196.

A pulling member 208, which has a first U-shaped slot 204 and a second U-shaped slot 206 defined therein, is mounted on a distal end of the fifth rod 198. The first U-shaped slot 204 and the second U-shaped slot 206 are angularly spaced from each other by about 180°.

The first finger 200 and the second finger 202 are fitted respectively in a first bracket 210 and a second bracket 212 having a first guide pin 214 and a second guide pin 216, respectively, which are inserted respectively in the first U-shaped slot 204 and the second U-shaped slot 206. A pivot shaft 218 extends through the first bracket 210 and the second bracket 212.

Figure 10:
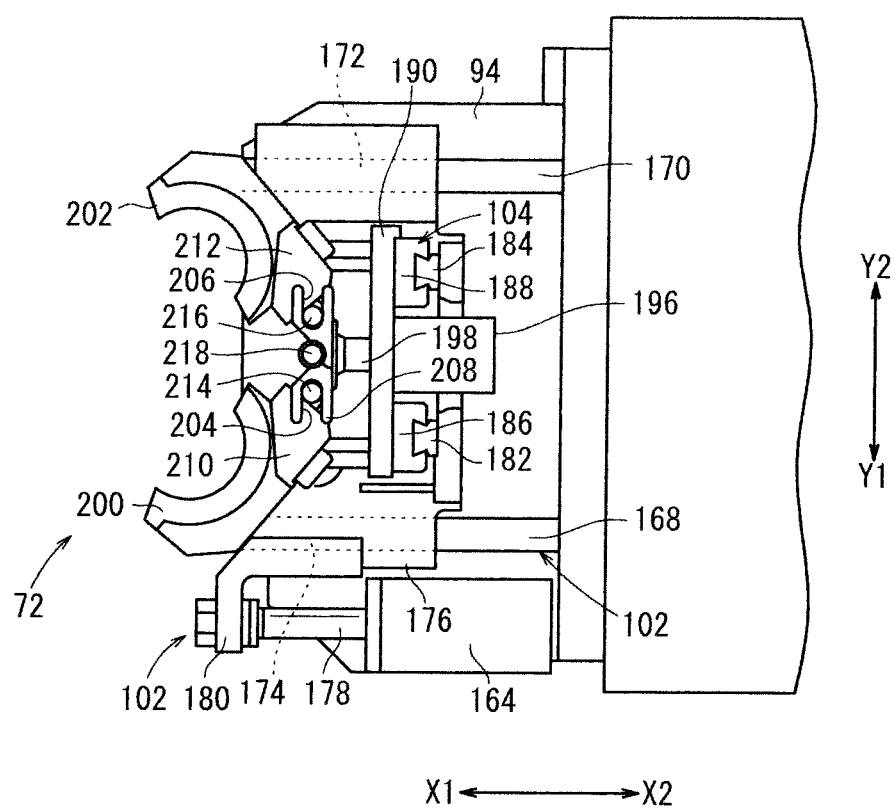
FIG. 10 is a view, partially cut away, showing a boot gripping mechanism illustrated in FIG. 9, with a first finger and a second finger thereof being in an open state.

As shown in FIG. 10, when the fifth cylinder 196 is actuated to retract the fifth rod 198, the first guide pin 214 and the second guide pin 216, which are inserted respectively in the first U-shaped slot 204 and the second U-shaped slot 206, are pulled by the pulling member 208, thereby spacing the first finger 200 and the second finger 202 apart from each other and opening the boot gripping mechanism 72. When the fifth rod 198 is extended, the first finger 200 and the second finger 202 are brought toward each other, thereby closing the boot gripping mechanism 72, as shown in FIG. 9.

Figure 11:
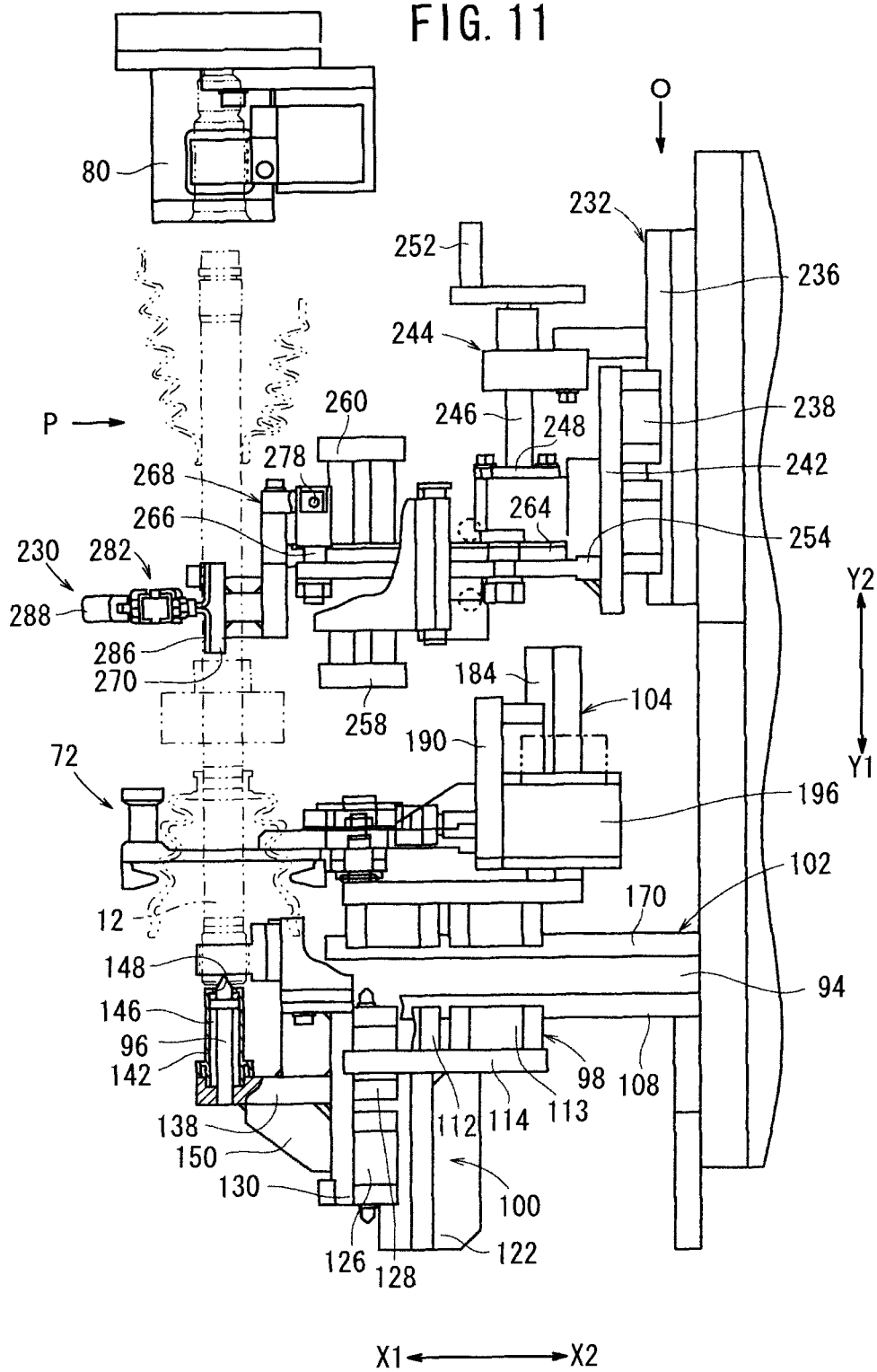
FIG. 11 is an enlarged fragmentary side elevational view of the constant velocity joint assembly apparatus shown in FIG. 5.
Figure 12:
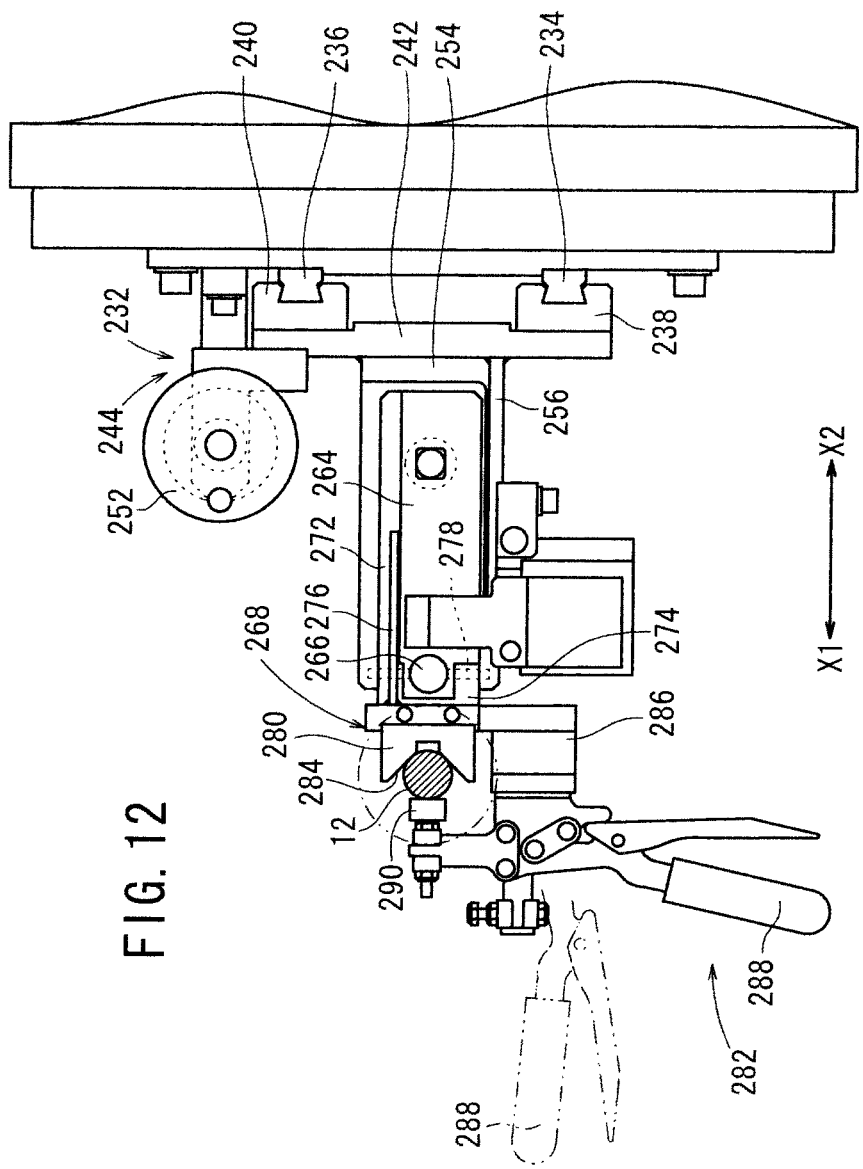
FIG. 12 is a view, partially cut away, taken along the direction indicated by the arrow O in FIG. 11.

According to the present embodiment, as shown in FIGS. 5 and 11, a clamp mechanism 230 is disposed displaceably between the first linear guide 98 and the second ball screw mechanism 82. More specifically, as shown in FIG. 12, which is a view, partially cut away, taken along the direction indicated by the arrow O in FIG. 11, a fifth linear guide 232 is mounted on the second mount plate 86 (see FIG. 5), and the clamp mechanism 230 is displaceable in directions indicated by the arrows Y1, Y2 along an eighth guide rail 234 and a ninth guide rail 236 of the fifth linear guide 232.

Figure 13:
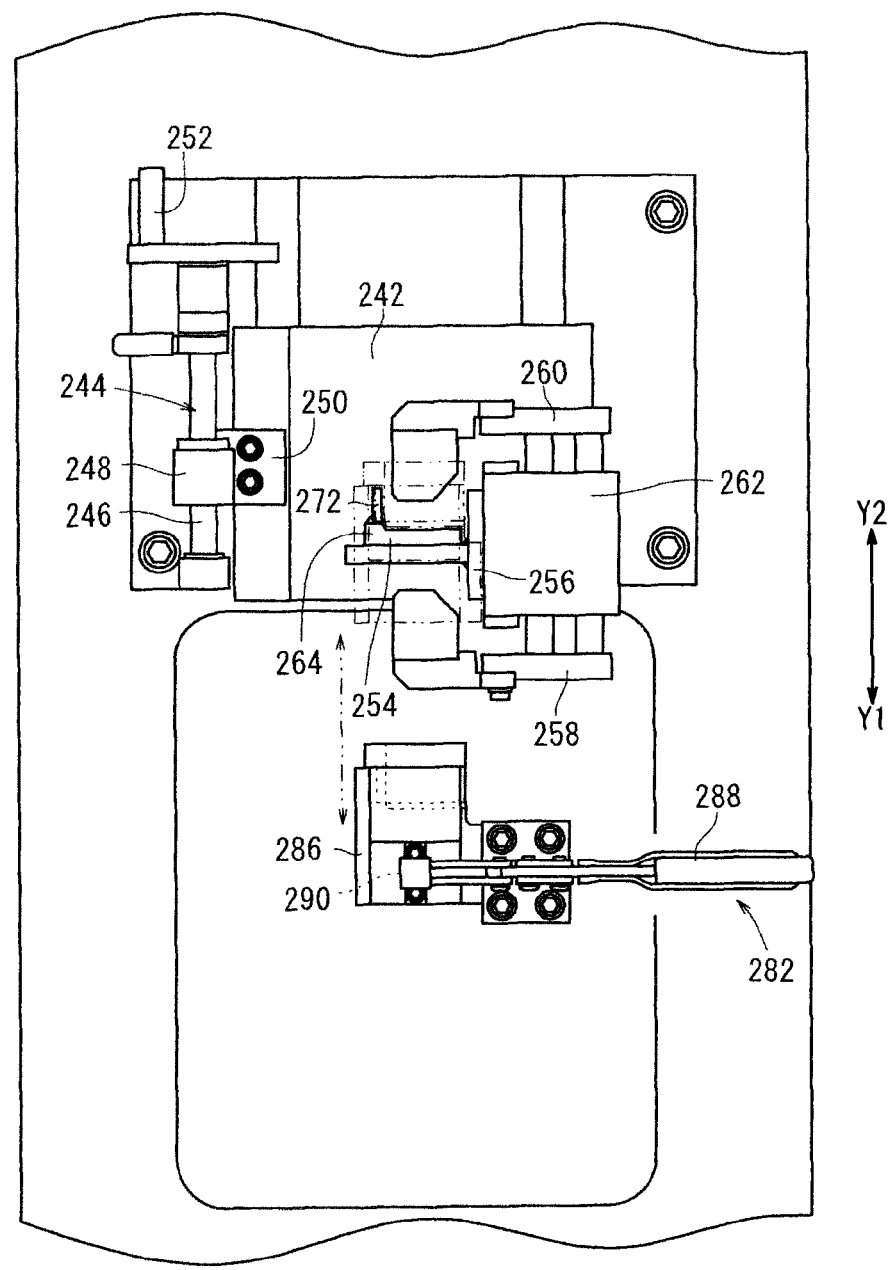
FIG. 13 is a view, partially cut away, taken along the direction indicated by the arrow P in FIG. 11.

A slide plate 242 is mounted on and extends from a slider 238 on the eighth guide rail 234 to a slider 240 on the ninth guide rail 236. As shown in FIG. 13, which is a view taken along the direction indicated by the arrow P in FIG. 11, the slide plate 242 is coupled by a coupling plate 250 to a third displaceable nut 248, which is threaded over a third ball screw 246 of a third ball screw mechanism 244. When the operator grips and turns a handle 252 to displace the third displaceable nut 248 along the third ball screw 246, the slide plate 242, which is coupled to the third displaceable nut 248 by the coupling plate 250, also is displaced.

A columnar support member 254 (see FIGS. 12 and 13), which is substantially inversely T-shaped in cross section, is mounted on the slide plate 242. A planar support member 256 extends along the direction of the columnar support member 254, and is attached to a side surface of the columnar support member 254. The columnar support member 254 is prevented from falling over due to being supported by the planar support member 256.

As shown in FIG. 13, a gripping cylinder 262, including a first synchronizing rod 258 and a second synchronizing rod 260, which are drivable in synchronism with each other, is mounted on a side surface of the planar support member 256. The first synchronizing rod 258 and the second synchronizing rod 260 grip the columnar support member 254 and a panel 264, respectively, from the side of the columnar support member 254 and the panel 264.

The panel 264 is coupled to an end face of the columnar support member 254 by a coupling pin 266. The coupling pin 266 has a body substantially in the form of a rectangular parallelepiped, which is coupled to an end of a planar clamp mechanism support plate 270 by a coupling jig 268.

A protruding plate 272 is mounted on an end face of the panel 264 and lies substantially perpendicular to the end face of the panel 264. The clamp mechanism support plate 270 is placed on upper end faces of the panel 264 and the protruding plate 272.

As shown in FIG. 12, the coupling jig 268 includes a short wall 274 and a long wall 276, which extend in surrounding relation to the body of the coupling pin 266. A securing pin 278 extends between and is mounted on the short wall 274 and on the long wall 276. The securing pin 278 extends through the body of the coupling pin 266, thereby positioning and securing the coupling jig 268, and hence the clamp mechanism support plate 270, with the coupling jig 268 coupled to the end thereof.

The long wall 276 has an end face, which faces the panel 264, and which is held in abutment against a distal end face of the protruding plate 272, thereby positioning the clamp mechanism support plate 270.

A placement base 280 for supporting the drive power transmitting shaft 12 is disposed on the clamp mechanism support plate 270. The placement base 280 has a V-groove 284 having a substantially V-shaped cross section defined therein for gripping the drive power transmitting shaft 12, which has a circular cross-sectional shape, in cooperation with a clamp 282.

The clamp 282 is fixed to a seat 286 disposed on the clamp mechanism support plate 270. The clamp 282 includes a lever 288 movable by the operator, and a pressing bar 290, which moves toward the seat 286 when the lever 288 is moved to the imaginary-line position shown in FIG. 12. As shown in FIG. 12, the pressing bar 290 becomes locked when the lever 288 is moved to the imaginary-line position. At this time, the lever 288 also is locked. The lever 288 remains locked until the lever 288 is unlocked by the operator.

Even when the lever 288 and the pressing bar 290 are locked, the drive power transmitting shaft 12 remains slidable along the slanted surfaces of the V-groove 284.

When there is play developed in the second outer member holder 80, the shank 76 of the outer member 74 of the Birfield constant velocity joint 14 is inserted into the second outer member holder 80. As described above, by operation of the turning mechanism 83, the second outer member holder 80 is displaced by the second ball screw mechanism 82, and upon displacement thereof, is turned through a predetermined angle.

The second ball screw mechanism 82 is identical in construction and operation to the first ball screw mechanism 68. More specifically, the second ball screw mechanism 82 includes a second motor 292, a second ball screw 294 coupled to the rotational shaft of the second motor 292, and a second movable nut 296 threaded over the second ball screw 294. The second outer member holder 80 is coupled to the second movable nut 296. When the second motor 292 is energized, the second ball screw 294 rotates about its axis, thereby guiding the second movable nut 296 to move vertically, which also enables the second outer member holder 80 to move vertically.

The assembly apparatus 60 thus constructed is housed in a casing 298, which is fixed to the support column 64 (see FIG. 5). Reference numeral 300 in FIG. 5 represents a door member, which is openable and closable with respect to the casing 298.

The assembly apparatus 60 according to the present embodiment is basically constructed as described above. Operations and advantages of the assembly apparatus 60 will be described below in relation to a method of assembling a constant velocity joint according to the present embodiment.

First, the Birfield constant velocity joint 14 is installed on one end of the drive power transmitting shaft 12. The Birfield constant velocity joint 14 is installed by an assembly apparatus, not shown, which is different from the assembly apparatus 60. Although not shown, a dynamic damper is fitted over a longitudinal middle portion of the drive power transmitting shaft 12. The joint boot 56 of the tripod constant velocity joint 16 is mounted on the drive power transmitting shaft 12 in the vicinity of the other end thereof (see FIG. 15).

Figure 14:
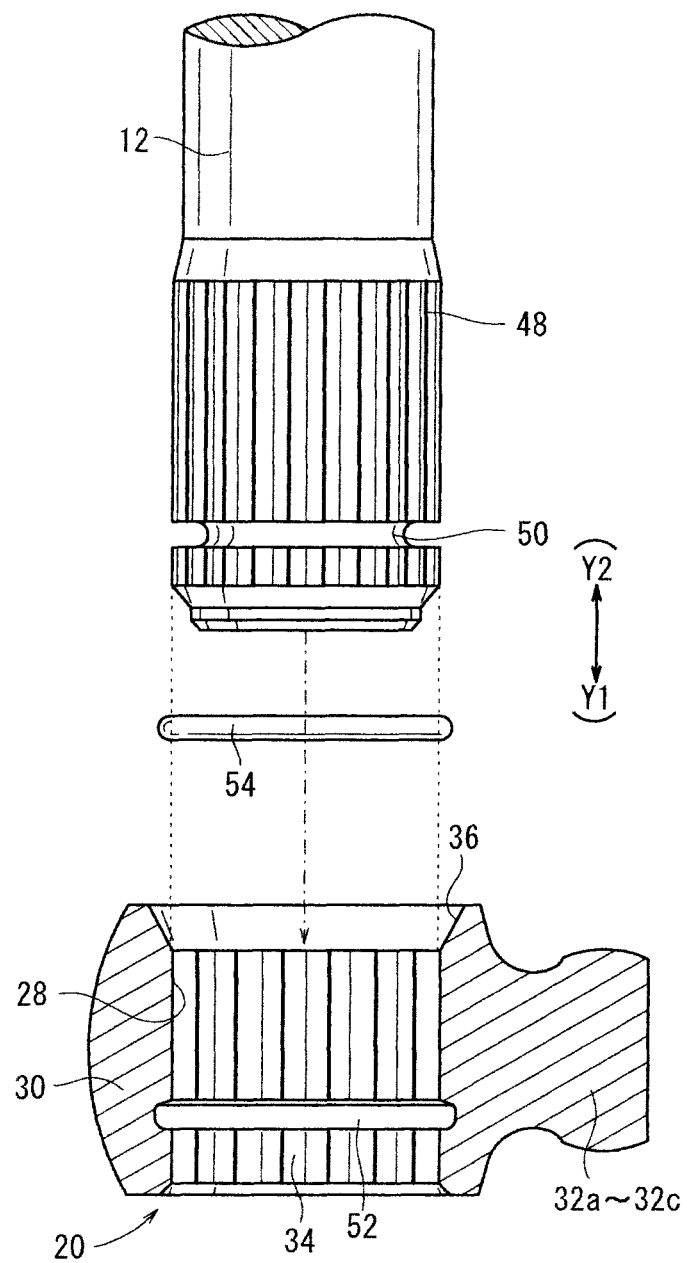
FIG. 14 is a fragmentary vertical cross-sectional view showing a state in which, after the engaging member has engaged in a first annular groove defined in a drive power transmitting shaft, the drive power transmitting shaft is passed through a through hole of an inner member.

As shown schematically in FIG. 14, the clip 54 is placed in the first annular groove 50 in the drive power transmitting shaft 12. Although not shown in FIG. 14, the inner member 20 is inserted in advance in the cup-shaped portion 22 of the outer member 18, as described later.

When the clip 54 does not engage in the second annular groove 52, the clip 54 has an inside diameter D (see FIG. 4), which is greater than the distance from the center of the drive power transmitting shaft 12 to the bottom of the first annular groove 50. Therefore, when the clip 54 engages only in the first annular groove 50, a clearance is formed between the inner wall of the clip 54 and the bottom of the first annular groove 50. Stated otherwise, the clip 54 engages with the first annular groove 50 with a certain amount of play therebetween.

Then, in order to construct the drive power transmitting mechanism 10, the drive power transmitting shaft 12 with the clip 54 mounted in the first annular groove 50 is passed through the through hole 28 of the inner member 20 (see FIG. 14). The tripod constant velocity joint 16 is thereby installed on the other end of the drive power transmitting shaft 12.

Figure 15:
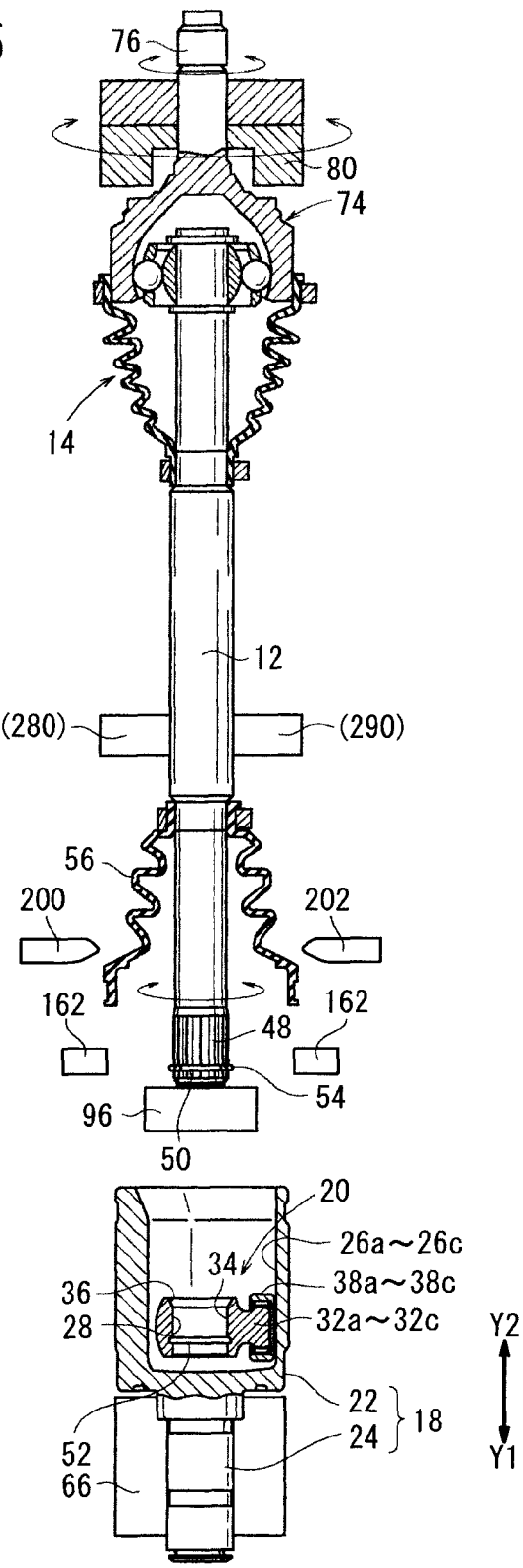
FIG. 15 is an enlarged fragmentary view showing a state in which a shaft of an outer member of a Birfield constant velocity joint and a shaft of an outer member of a tripod constant velocity joint are inserted respectively in a first outer member holder and in a second outer member holder.

The tripod constant velocity joint 16 is assembled in the following manner by the assembly apparatus 60. FIG. 15 and subsequent figures have been simplified to clarify the operation of each mechanism.

First, as shown in FIG. 15, the shank 76 of the outer member 74 of the Birfield constant velocity joint 14 is inserted into the second outer member holder 80. As described above, since there is a slight amount of play between the shank 76 and the second outer member holder 80, the drive power transmitting shaft 12 is swingable about a portion thereof, which is held by the second outer member holder 80.

The drive power transmitting shaft 12 is inserted into the V-groove 284 in the placement base 280 (see FIG. 12). Since the drive power transmitting shaft 12 abuts against the walls of the V-groove 284, the drive power transmitting shaft 12 is prevented from swinging.

A predetermined number of needle bearings 40 are placed between the flanges 42a, 42b of each of the roller members 38a through 38c. The roller members 38a through 38c then are mounted respectively on the trunnions 32a through 32c of the inner member 20.

Then, the inner member 20 is housed in the cup-shaped portion 22 of the outer member 18. More specifically, the roller members 38a through 38c, which are mounted on the trunnions 32a through 32c, are inserted into the track grooves 26a through 26c.

The shank 24 of the outer member 18 then is inserted into the first outer member holder 66. Upon insertion of the shank 24, the roller members 38a through 38c are moved by gravity to an endpoint on the bottom of the cup-shaped portion 22.

Then, the first motor 88 of the first ball screw mechanism 68 and the second motor 292 of the second ball screw mechanism 82 are energized in order to displace the first movable nut 92 and the second movable nut 296 along the first ball screw 90 and the second ball screw 294, respectively. Since the first movable nut 92 and the second movable nut 296 are displaced in this manner, the drive power transmitting shaft 12 is fed to a given location in the assembly apparatus 60.

Then, the shaft positioning member 96 of the centering mechanism 70 is displaced to a position at which the shaft positioning member 96 can engage in the bottomed hole, which is defined in the distal end face of the drive power transmitting shaft 12. More specifically, the first cylinder 116 and the second cylinder 134 are actuated to extend or retract the first rod 118 and the second rod 136, thereby displacing the first bridge plate 114 along the directions indicated by the arrows X1, X2 in FIG. 7, and displacing the second bridge plate 130 along the directions indicated by the arrows Y1, Y2 in FIGS. 6 and 8. The directions and the distances over which the first bridge plate 114 and the second bridge plate 130 are displaced are adjusted, so as to cause the tapered engaging portion of the shaft positioning member 96 to engage in the bottomed hole of the drive power transmitting shaft 12. Thus, the axis of the drive power transmitting shaft 12 and the center of the through hole 28 are aligned with each other. At this time, the pressing teeth 162, the first finger 200, and the second finger 202 are open.

Thereafter, the operator operates the lever 288 of the clamp 282 in order to move the pressing bar 290 of the clamp 282 toward the placement base 280. As a result, the drive power transmitting shaft 12 is gripped between the pressing bar 290 and the placement base 280 (the walls of the V-groove 284). In FIG. 15, the drive power transmitting shaft 12 is shown schematically as being gripped between the pressing bar 290 and the placement base 280.

The operator may rotate the handle 252 to displace the slide plate 242, for thereby placing the clamp mechanism 230 in a desired position in advance.

Then, the turning mechanism 83 is actuated in order to turn the drive power transmitting shaft 12 clockwise or counterclockwise intermittently about its axis through a prescribed angle. As a result, the drive power transmitting shaft 12 is brought into phase with the through hole 28 of the inner member 20. As described above, since the drive power transmitting shaft 12 can slide even while the drive power transmitting shaft 12 is gripped by the pressing bar 290 of the clamp 282 and the placement base 280, the process of bringing the drive power transmitting shaft 12 into phase with the through hole 28 is not impaired as a result of the drive power transmitting shaft 12 being clamped by the clamp mechanism 230.

Then, the pressing tooth cylinder 154 (see FIGS. 7 and 8) is actuated to bring the pressing tooth rods 156, 158, and hence the pressing tooth coupling plates 160, into close proximity with each other, thereby closing the pressing teeth 162, as shown in FIG. 6. At this time, the clip 54 is pressed by the pressing teeth 162.

Figure 16:
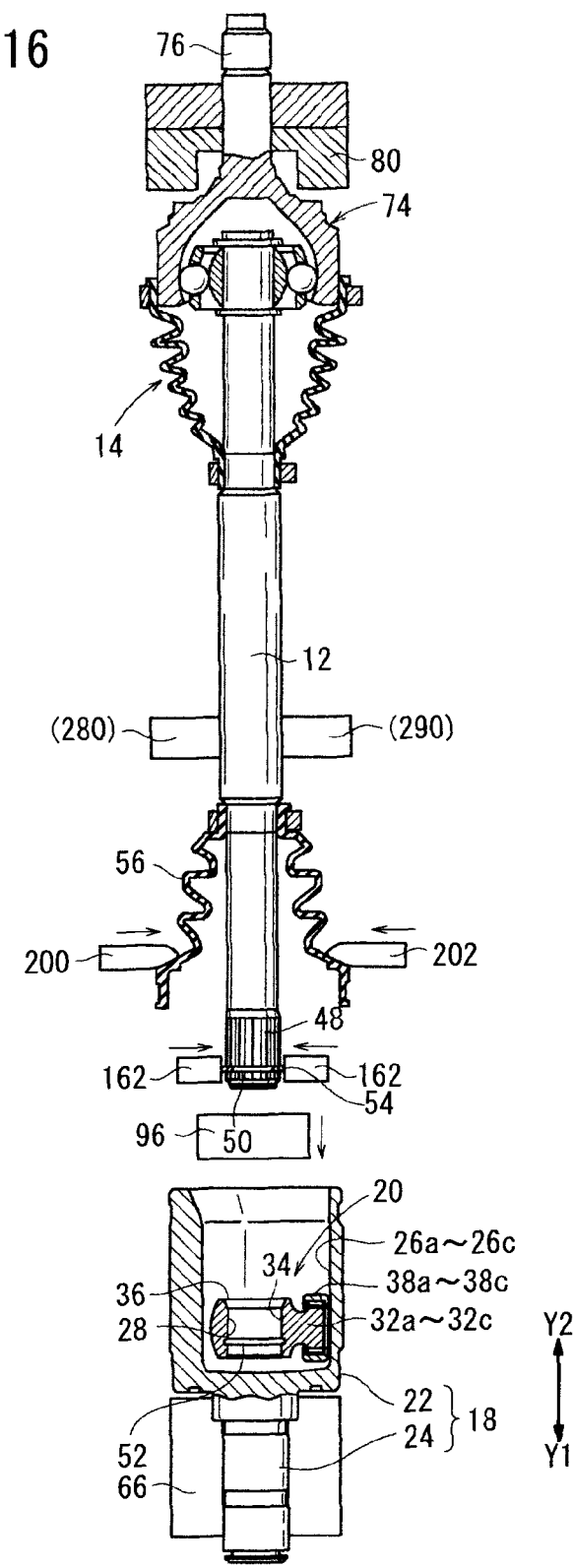
FIG. 16 is an enlarged fragmentary view showing a state in which the clip is pressed by pressing teeth of a clip pressing mechanism.
Figure 17:
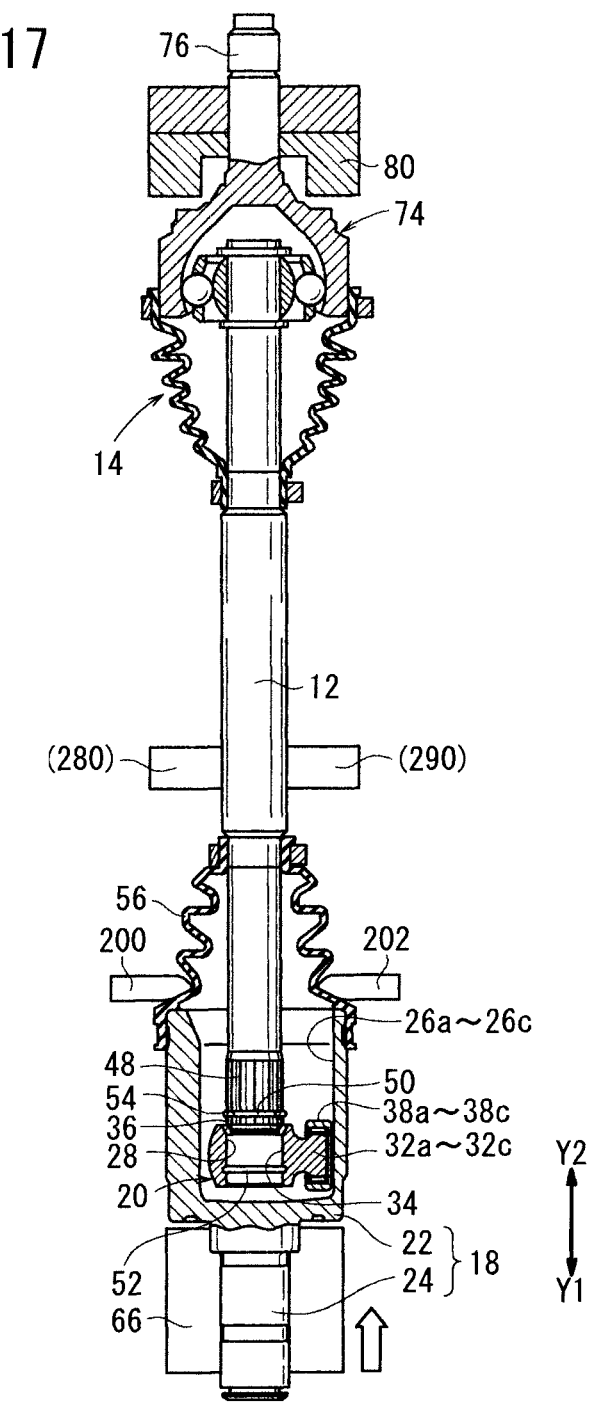
FIG. 17 is an enlarged fragmentary view showing a state in which the outer member of the tripod constant velocity joint is lifted to insert an end of the drive power transmitting shaft slightly into the through hole of the inner member.

About or exactly at the same time, the fifth cylinder 196 (see FIGS. 9 and 10) is actuated to extend the fifth rod 198. The first finger 200 and the second finger 202 are brought into close proximity with each other (see FIG. 9) and grip the joint boot 56 (see FIG. 16).

Thereafter, the first cylinder 116 and the second cylinder 134 are actuated to extend or retract the first rod 118 and the second rod 136, thereby spacing the shaft positioning member 96 from the drive power transmitting shaft 12. About or exactly at the same time, the pressing tooth cylinder 154 is actuated in order to open the pressing teeth 162, thereby releasing the clip 54.

Then, the first motor 88 is energized again to displace the first movable nut 92 toward the Birfield constant velocity joint 14. As the Birfield constant velocity joint 14 is displaced, the outer member 18 of the tripod constant velocity joint 16 is lifted in unison with the first outer member holder 66 along the first ball screw 90 until the end of the drive power transmitting shaft 12 is inserted slightly into the through hole 28 of the inner member 20.

Figure 18:
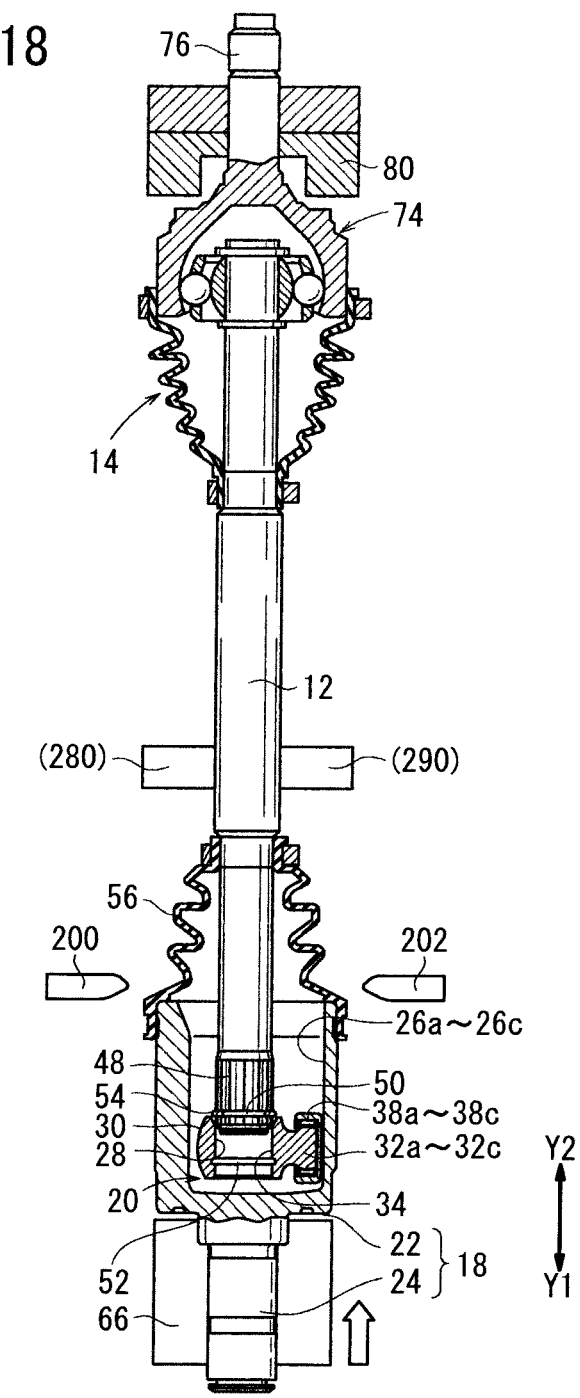
FIG. 18 is an enlarged fragmentary view showing a state in which the first finger and the second finger are spaced from each other in order to release a joint boot.

Then, the first motor 88 is temporarily de-energized, so as to stop the outer member 18 from being lifted, and also to stop the drive power transmitting shaft 12 from being inserted into the through hole 28 of the inner member 20. Thereafter, the fifth cylinder 196 is actuated to retract the fifth rod 198 (see FIG. 10). As a result, as shown in FIG. 18, the first finger 200 and the second finger 202 are spaced from each other, thereby releasing the joint boot 56.

Then, the first motor 88 is energized again to lift the outer member 18 of the tripod constant velocity joint 16 along the first ball screw 90 in unison with the first outer member holder 66. As the outer member 18 is lifted, the drive power transmitting shaft 12 is inserted further into the through hole 28, thereby bringing the splines 34 on the drive power transmitting shaft 12 and the splines 48 on the inner wall of the through hole 28 into meshing engagement with each other.

Figure 19:
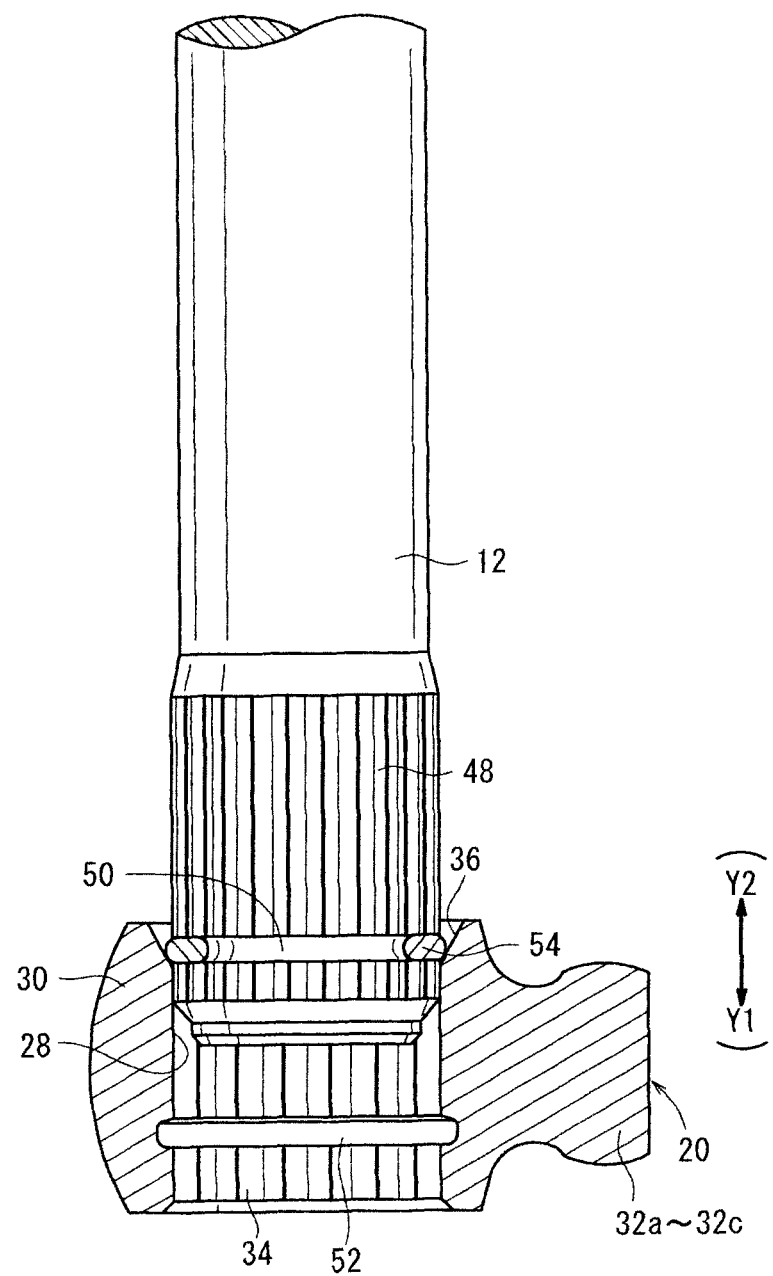
FIG. 19 is a fragmentary vertical cross-sectional view showing a state in which the clip starts to be compressed and shrunk, as the diameter of a tapered progressively-smaller-diameter portion becomes progressively smaller.

Simultaneously, as shown fragmentarily at an enlarged scale in FIG. 19, as the diameter of the tapered progressively-smaller-diameter portion 36 becomes progressively smaller, the clip 54 is compressed toward the bottom of the first annular groove 50, thereby reducing the diameter thereof. Thus, it is understood that the tapered progressively-smaller-diameter portion 36 functions as a guide for guiding the clip 54 into the through hole 28, while at the same time reducing the diameter of the clip 54.

Figure 20:
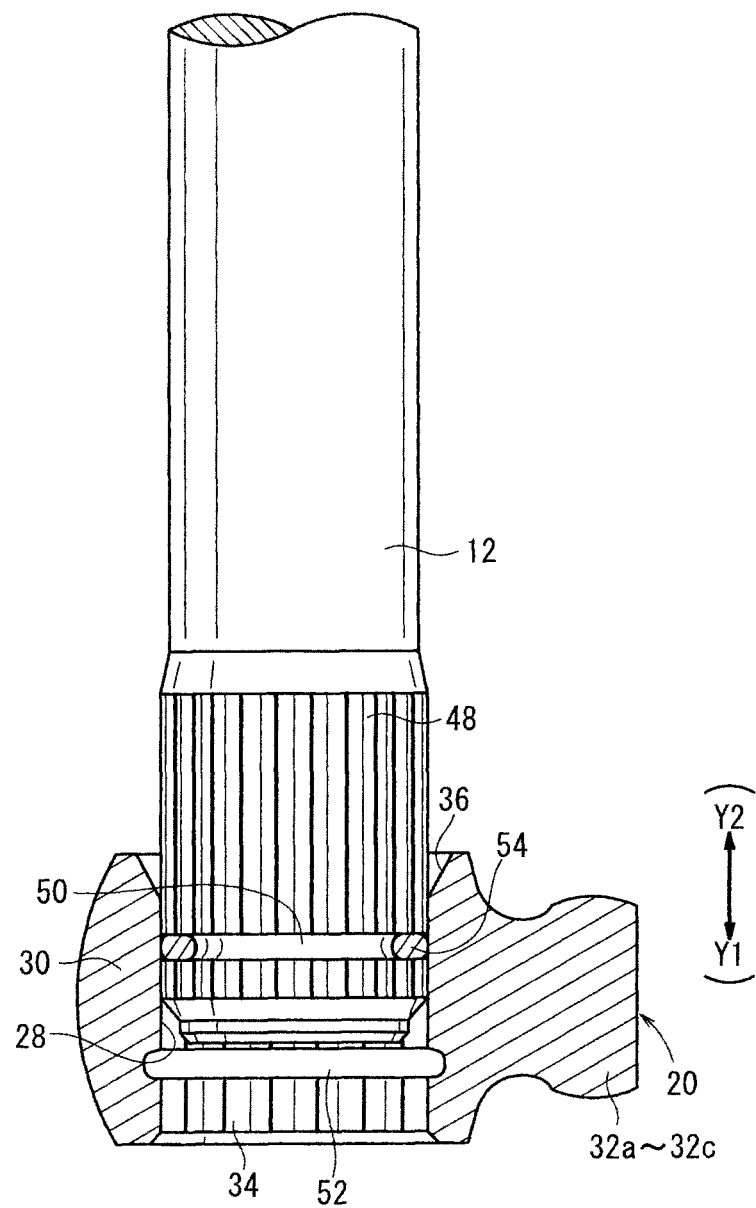
FIG. 20 is a fragmentary vertical cross-sectional view showing a state in which the clip moves in the through hole, as the diameter of the clip is reduced to a diameter corresponding to the inside diameter of the through hole.

When the drive power transmitting shaft 12 is inserted further, as shown in FIG. 20, the clip 54 becomes further reduced in diameter, so that the outside diameter thereof becomes substantially equal to the diameter of a constant-diameter portion of the through hole 28. At this time, the drive power transmitting shaft 12 is not blocked by the clip 54, which is reduced in diameter. Stated otherwise, the clip 54, having been reduced in diameter, does not prevent the drive power transmitting shaft 12 from being inserted.

Figure 21:
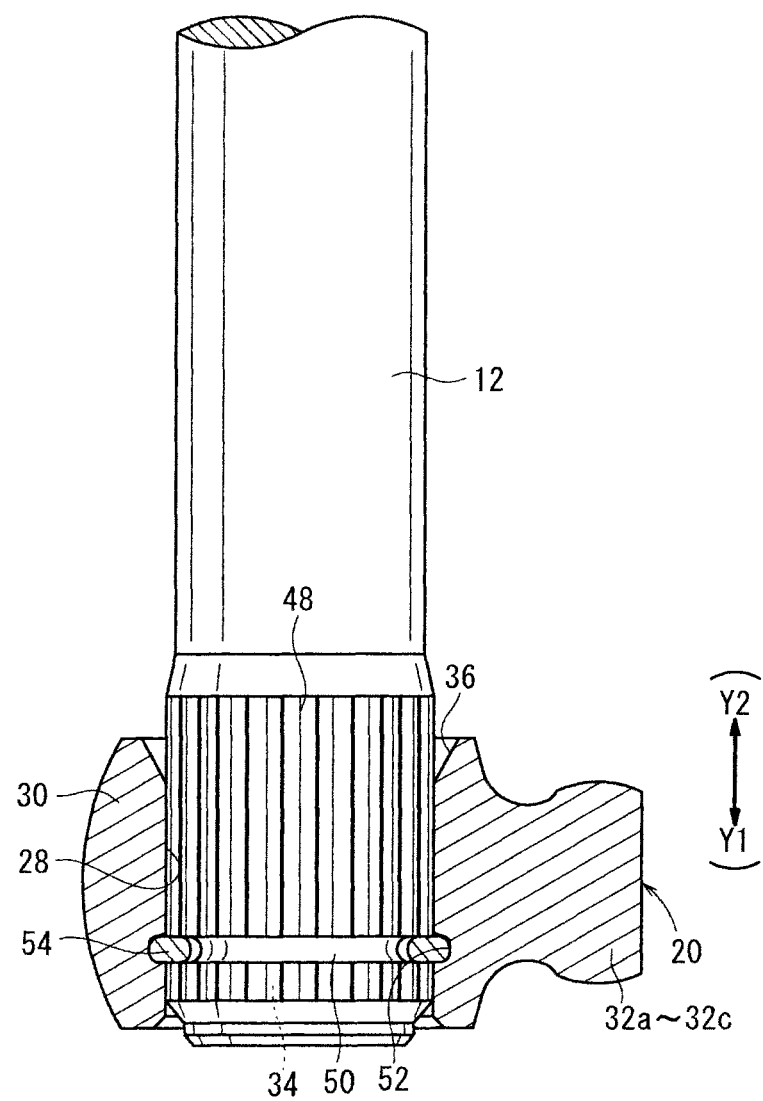
FIG. 21 is a fragmentary vertical cross-sectional view showing a state in which the clip engages in the first annular groove defined in the drive power transmitting shaft, and in a second annular groove defined in an inner wall of the through hole of the inner member.
Figure 22:
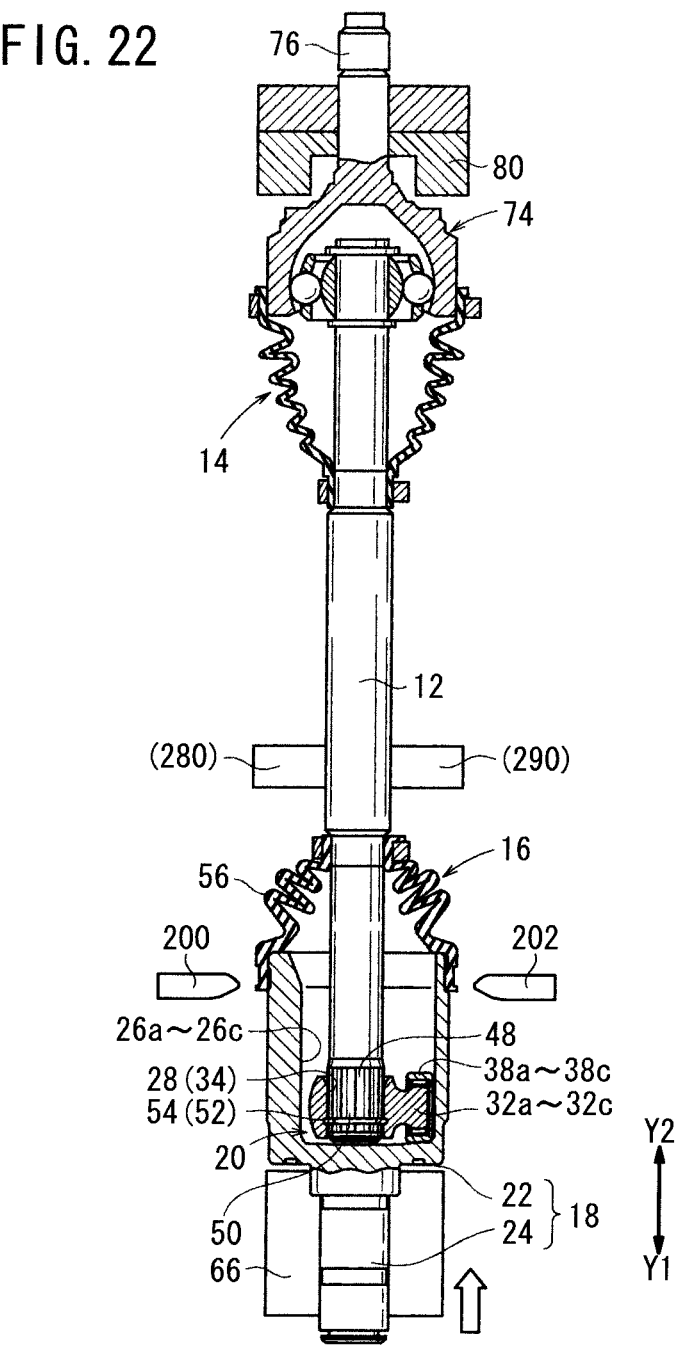
FIG. 22 is an enlarged fragmentary view showing a state in which the joint boot is compressed when the parts are in the state shown in FIG. 21.

When the drive power transmitting shaft 12 is inserted further as the outer member 18 is further lifted, the first annular groove 50 and the second annular groove 52 become positionally aligned with each other, as shown in FIGS. 21 and 22. At this time, the clip 54 tends to be restored elastically to its original shape. As a result, the clip 54 engages simultaneously both in the first annular groove 50 and in the second annular groove 52. The clip 54, which engages both in the first annular groove 50 and in the second annular groove 52, prevents the inner member 20 from becoming dislodged from the drive power transmitting shaft 12.

In some cases, the clip 54 may not engage in the second annular groove 52, and the distal end face of the drive power transmitting shaft 12 may abut against the bottom of the cup-shaped portion 22. If this happens, the rotational drive power of the transmission is not appropriately transmitted to the drive power transmitting shaft 12. Accordingly, the operator needs to be able to recognize that the drive power transmitting shaft 12 has been positioned by the clip 54, which engages in the second annular groove 52.

According to the present embodiment, as described above, the roller members 38a through 38c together with the inner member 20 are inserted up to the endpoint on the bottom of the cup-shaped portion 22. Therefore, the inner member 20 is maintained in a constant position.

The end of the drive power transmitting shaft 12 is then inserted into the through hole 28 of the inner member 20. When the drive power transmitting shaft 12 is positioned by the clip 54, which engages both in the first annular groove 50 and in the second annular groove 52, the drive power transmitting shaft 12 stops at a substantially constant position in all identical tripod constant velocity joints 16. Stated otherwise, if a plurality of tripod constant velocity joints 16 are assembled, then the drive power transmitting shafts 12 are inserted into the cup-shaped portions 22 at substantially identical distances.

If the clip 54 does not engage in the second annular groove 52, and the distal end face of the drive power transmitting shaft 12 abuts against the bottom of the cup-shaped portion 22, then the distance by which the drive power transmitting shaft 12 is inserted is greater than the distance by which the drive power transmitting shaft 12 is inserted when it is positioned by the clip 54, which engages both in the first annular groove 50 and in the second annular groove 52. Therefore, the distance by which the drive power transmitting shaft 12 is inserted is determined, and if the determined distance is greater than it should be, the operator recognizes that the clip 54 has not engaged in the second annular groove 52. Conversely, if the determined distance remains substantially constant, then the operator judges that the clip 54 has engaged in the second annular groove 52.

The roller members 38a through 38c are positioned in the track grooves 26a through 26c at the endpoint on the bottom of the cup-shaped portion 22, and then the end of the drive power transmitting shaft 12 is inserted into the through hole 28 of the inner member 20, whereupon the distance by which the drive power transmitting shaft 12 is inserted is determined. It is then possible to determine with ease whether or not the clip 54 engages both in the first annular groove 50 and in the second annular groove 52, and hence, whether the drive power transmitting shaft 12 has been coupled to the inner member 20 or not.

When the clip 54 engages both in the first annular groove 50 and in the second annular groove 52, the joint boot 56 becomes compressed as shown in FIG. 22. Stated otherwise, pressure is applied to the joint boot 56, and therefore, air is removed from the joint boot 56.

More specifically, the rotational shaft of the first motor 88 together with the first ball screw 90 are rotated in a direction that is opposite to the direction in which they have been rotated thus far. As a result, as shown in FIG. 23, the outer member 18 that is held by the first outer member holder 66 is lowered, so that the inner member 20 is elevated relatively to be positioned at longitudinal middle portions of the track grooves 26a through 26c.

Figure 23:
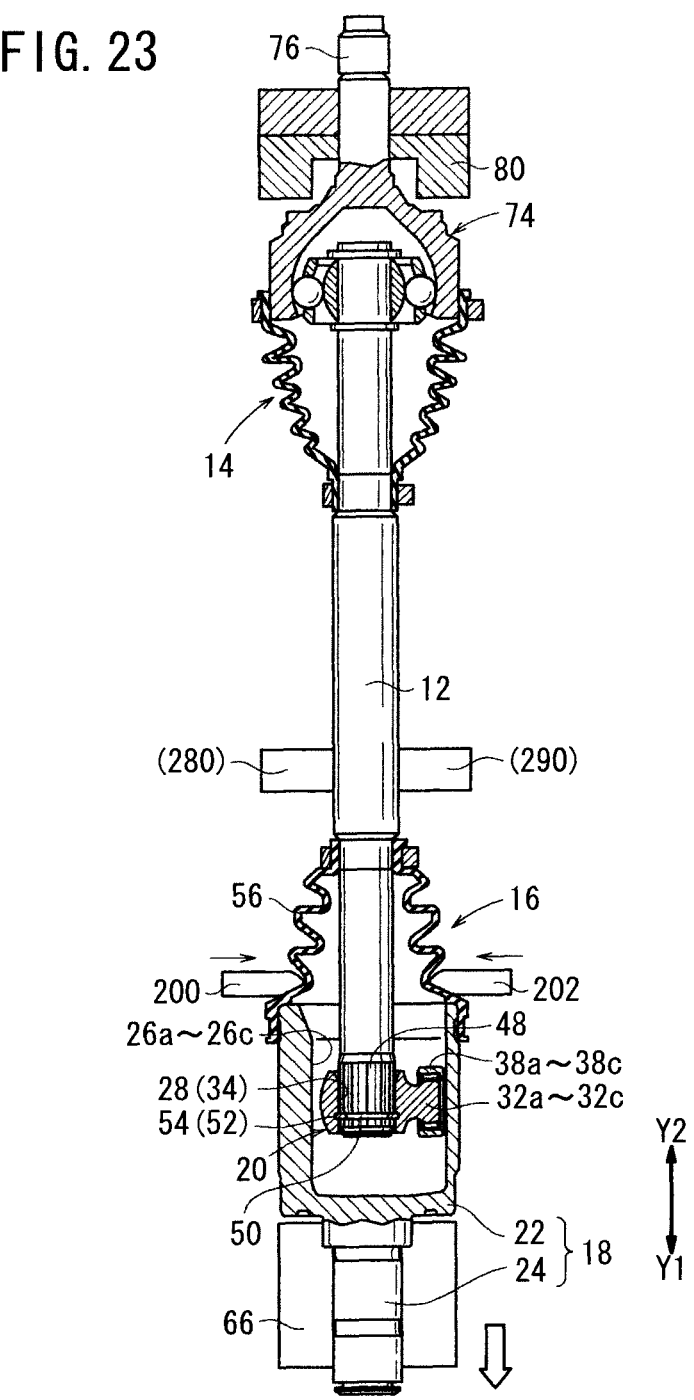
FIG. 23 is an enlarged fragmentary view showing a state in which the outer member is lowered from the state shown in FIG. 22.

Thereafter, the fifth cylinder 196 (see FIGS. 9 and 10) is actuated in order to extend the fifth rod 198, and to thereby close the first finger 200 and the second finger 202 for gripping the joint boot 56 (see FIG. 23). The fourth cylinder 166 (see FIG. 8) is actuated in order to extend the fourth rod 194 in the direction indicated by the arrow Y2 in FIGS. 8 and 24.

Figure 24:
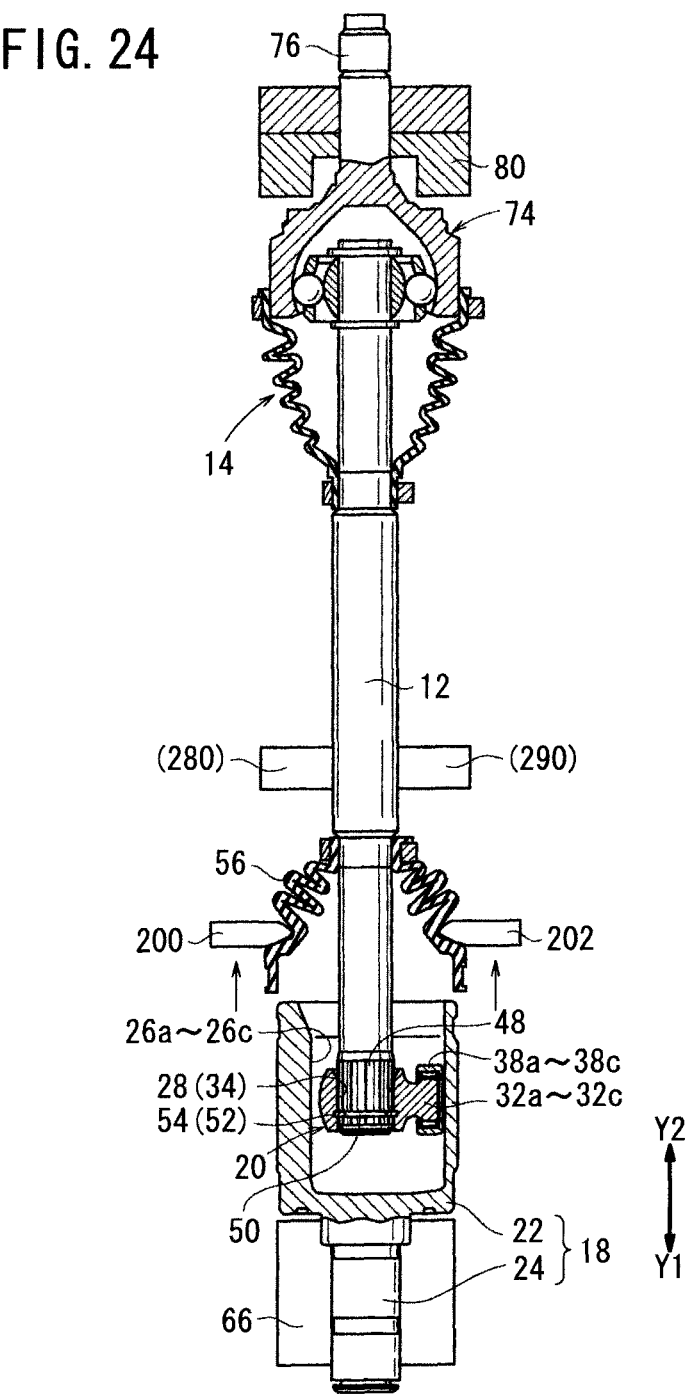
FIG. 24 is an enlarged fragmentary view showing a state in which the joint boot is released from the lowered outer member.

As described above, the first finger 200 and the second finger 202 are disposed on the fourth bridge plate 190 (see FIG. 8), which is displaced in the directions indicated by the arrows Y1, Y2 in FIGS. 6, 8, and 24 upon extension of the fourth rod 194. Therefore, as shown in FIG. 24, the first finger 200 and the second finger 202 are displaced in the direction indicated by the arrow Y2. As a result, the joint boot 56 temporarily is released from the outer member 18, whereupon air is removed from the joint boot 56.

Figure 25:
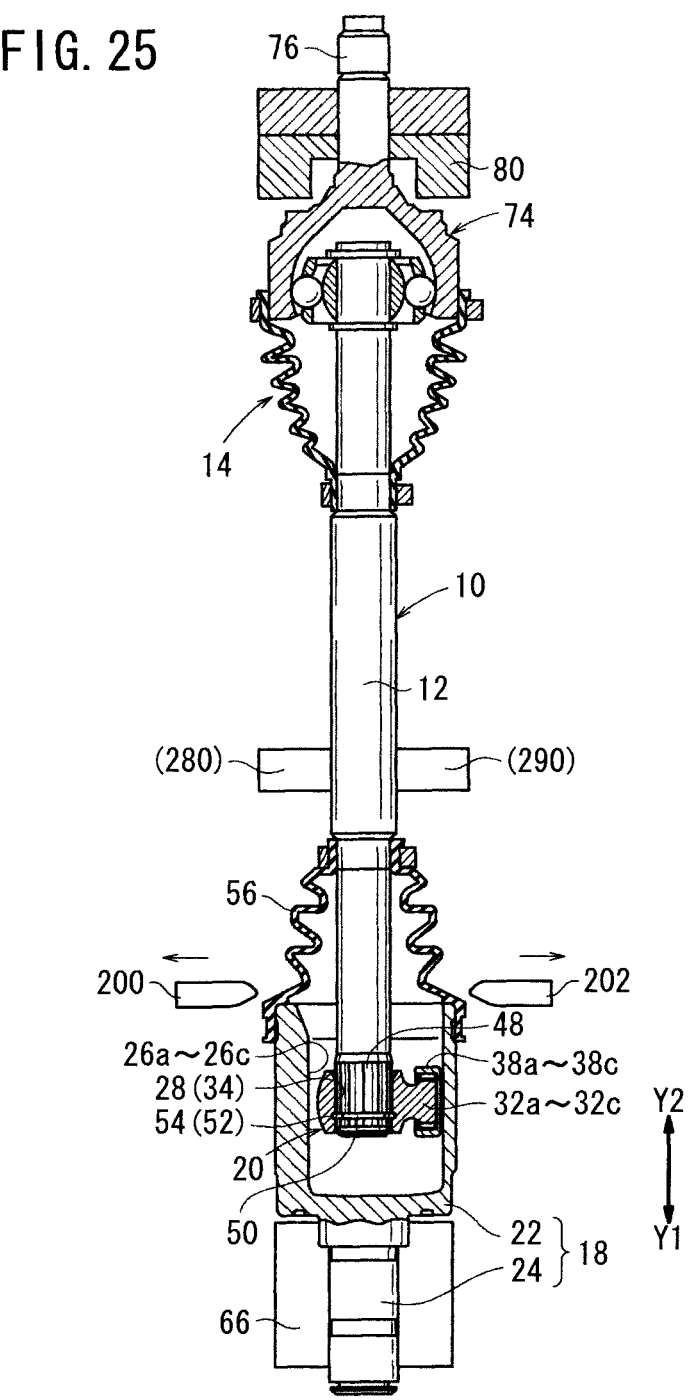
FIG. 25 is an enlarged fragmentary view showing a state in which the joint boot is mounted again on the outer member.

After the joint boot 56 has been bled in the foregoing manner, the fourth cylinder 166 (see FIG. 8) is actuated again in order to retract the fourth rod 194 in the direction indicated by the arrow Y1 in FIGS. 8 and 25. The joint boot 56 is mounted again on the cup-shaped portion 22 of the outer member 18, thereby bringing assembly of the tripod constant velocity joint 16 to an end. In other words, the drive power transmitting mechanism 10 is produced.

After the joint boot 56 has been mounted on the cup-shaped portion 22 of the outer member 18, the fifth cylinder 196 (see FIGS. 9 and 10) is actuated in order to retract the fifth rod 198 and to open the first finger 200 and the second finger 202, thereby releasing the joint boot 56 (see FIG. 25).

Figure 26:
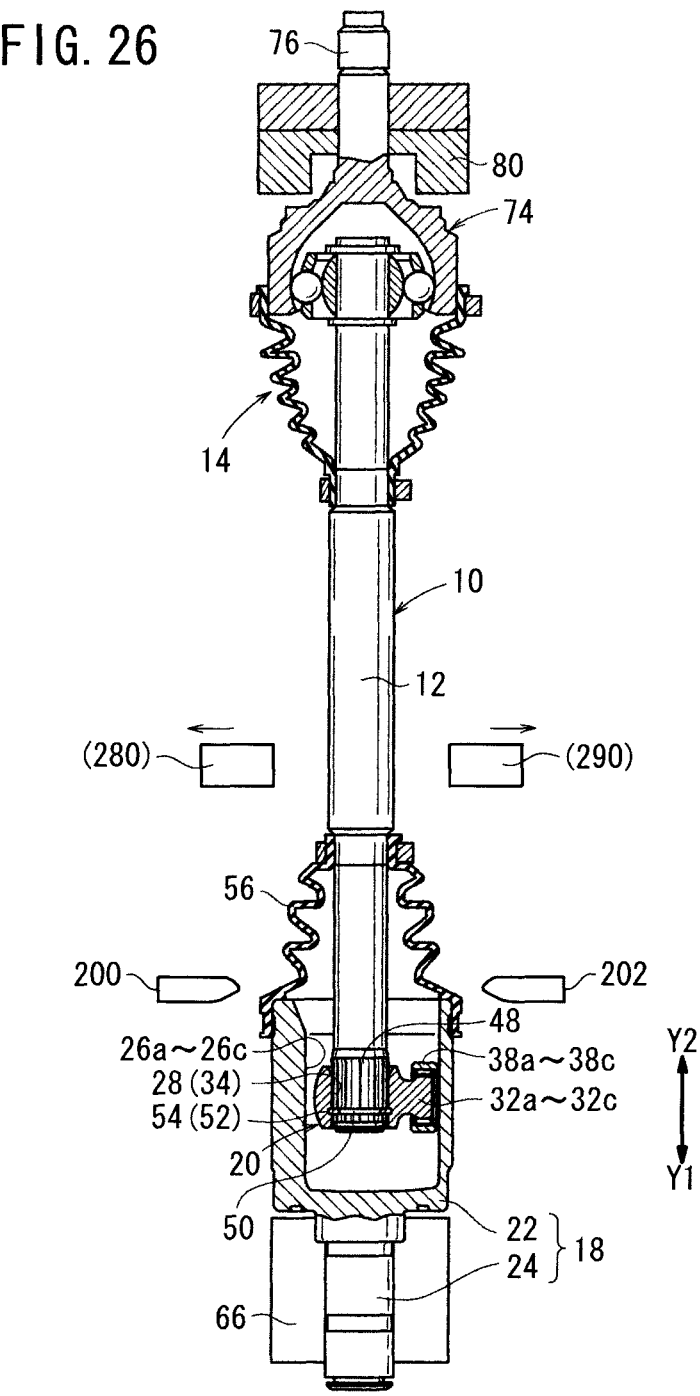
FIG. 26 is an enlarged fragmentary view showing a state in which the drive power transmitting mechanism is released from clamps.

Finally, as shown in FIG. 26, the operator manually operates the lever 288 of the clamp 282 in order to release the drive power transmitting shaft 12 from the pressing bar 290. In addition, the operator releases the outer member 18 of the tripod constant velocity joint 16 and the outer member 74 of the Birfield constant velocity joint 14 from the first outer member holder 66 and the second outer member holder 80, respectively, so that the drive power transmitting mechanism 10 can be removed from the assembly apparatus 60.

According to the present embodiment, as described above, the drive power transmitting shaft 12 can be coupled to the inner member 20, which has been housed in advance in the cup-shaped portion 22 of the outer member 18, since, as described above, the tapered progressively-smaller-diameter portion 36, which is defined in the opening of the through hole 28 of the inner member 20, functions as a shrinker for reducing the diameter of the clip 54. The tripod constant velocity joint 16 having the above construction can automatically be assembled by the assembly apparatus 60, rather than being manually assembled by an operator.

Consequently, the number of tedious and time-consuming manual steps is reduced. Furthermore, since the assembly apparatus 60 reduces the time required until the drive power transmitting shaft 12 is inserted into the cup-shaped portion 22 and becomes coupled to the inner member 20, assembly efficiency is increased. In other words, productivity of the tripod constant velocity joint 16 can be increased.

The present invention is not limited to the above embodiment, but various changes may be made to the embodiment without departing from the scope of the present invention.

For example, the engaging member that engages in the first annular groove 50 and the second annular groove 52 is not limited to a substantially C-shaped clip 54, but may be an elastic member, which is capable of being reduced in diameter by the tapered progressively-smaller-diameter portion 36 in the opening of the through hole 28, and which can be restored to its original shape when the first annular groove 50 and the second annular groove 52 are positionally aligned with each other. The clip 54 is not limited in particular to having an inner diameter D, which is greater than the distance from the center of the drive power transmitting shaft 12 to the bottom of the first annular groove 50.

The trunnions 32a through 32c may be of a simple cylindrical shape, and the rolling members may be balls or the like.

In the above embodiment, the tripod constant velocity joint 16 is installed after installation of the Birfield constant velocity joint 14. However, tripod constant velocity joints 16 may be installed on both ends of the drive power transmitting shaft 12. In this case, after one of the tripod constant velocity joints 16 has been installed on one end of the drive power transmitting shaft 12, the shank 24 of the outer member 18 of the installed tripod constant velocity joint 16 is inserted into the second outer member holder 80, and then, in accordance with the procedure described above, the other tripod constant velocity joint 16 may be installed on the remaining other end of the drive power transmitting shaft 12.

Furthermore, the drive power transmitting shaft 12 may be displaced with respect to the outer member 18, instead of displacing the second outer member holder 80, or stated otherwise, instead of displacing the outer member 18 of the tripod constant velocity joint 16.

The invention claimed is:

1. A constant velocity joint assembly apparatus for assembling a tripod constant velocity joint by fitting a drive power transmitting shaft with an engaging member engaging in an annular groove defined therein into a through hole defined in an inner member, the inner member being housed in an outer member having track grooves defined in an inner wall thereof, and having on a side wall thereof trunnions with roller members mounted thereon, which are slidably inserted in the track grooves, the constant velocity joint assembly apparatus comprising:
   a shaft holding mechanism for holding an end of the drive power transmitting shaft;
   a centering mechanism for aligning an axis of the drive power transmitting shaft and a center of the through hole with each other;
   a turning mechanism for bringing the drive power transmitting shaft and the through hole of the inner member into phase with each other; and
   an outer member displacing mechanism for displacing the outer member, which houses the inner member therein, with respect to the drive power transmitting shaft.

2. The constant velocity joint assembly apparatus according to claim 1, further comprising:
   a boot gripping mechanism for gripping a joint boot, which has been mounted in advance on the drive power transmitting shaft,
   wherein the boot gripping mechanism temporarily releases the joint boot, which has been mounted on the outer member, from the outer member when the drive power transmitting shaft is fitted in the through hole of the inner member, and thereafter mounts the joint boot again on the outer member.

\* \* \* \* \*